United States Patent
Ueno et al.

(10) Patent No.: US 12,394,819 B2
(45) Date of Patent: Aug. 19, 2025

(54) ALL-SOLID-STATE BATTERY

(71) Applicant: TDK CORPORATION, Tokyo (JP)

(72) Inventors: Tetsuya Ueno, Tokyo (JP); Gakuho Isomichi, Tokyo (JP); Taisuke Masuko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 583 days.

(21) Appl. No.: 16/970,699

(22) PCT Filed: Mar. 19, 2019

(86) PCT No.: PCT/JP2019/011354
§ 371 (c)(1),
(2) Date: Aug. 18, 2020

(87) PCT Pub. No.: WO2019/181909
PCT Pub. Date: Sep. 26, 2019

(65) Prior Publication Data
US 2020/0381774 A1    Dec. 3, 2020

(30) Foreign Application Priority Data

Mar. 19, 2018  (JP) ................. 2018-051192

(51) Int. Cl.
*H01M 10/0562* (2010.01)
*H01M 4/02* (2006.01)
(Continued)

(52) U.S. Cl.
CPC ......... *H01M 10/0562* (2013.01); *H01M 4/64* (2013.01); *H01M 2004/027* (2013.01); *H01M 2004/028* (2013.01); *H01M 50/107* (2021.01)

(58) Field of Classification Search
CPC .............................................. H01M 10/0562
See application file for complete search history.

(56) References Cited

U.S. PATENT DOCUMENTS

| 7,579,112 B2 * | 8/2009 | Chiang | H01M 10/058 |
| | | | 429/304 |
| 2006/0216603 A1 * | 9/2006 | Choi | H01M 4/0452 |
| | | | 427/126.6 |

(Continued)

FOREIGN PATENT DOCUMENTS

| CN | 104518237 B | * | 4/2017 | ......... H01M 2/1613 |
| EP | 3043406 A1 | * | 7/2016 | ........ H01M 10/0562 |

(Continued)

OTHER PUBLICATIONS

Jun. 25, 2019 International Search Report issued in Internaitonal Patent Application No. PCT/JP2019/011354.

(Continued)

*Primary Examiner* — Matthew T Martin
*Assistant Examiner* — Krishna R Hammond
(74) *Attorney, Agent, or Firm* — Oliff PLC

(57) ABSTRACT

An all-solid-state battery includes a positive electrode layer including a positive electrode current collector layer and a positive electrode active material layer provided on the positive electrode current collector layer, a negative electrode layer including a negative electrode current collector layer and a negative electrode active material layer provided on the negative electrode current collector layer, and a solid electrolyte layer which is arranged between the positive electrode layer and the negative electrode layer and contains a solid electrolyte, wherein the all-solid-state battery includes a power storage unit in which the positive electrode layer and the negative electrode layer face each other with the solid electrolyte layer therebetween and an exterior unit, and wherein the exterior unit has an ion conductivity of $10^{-2}$ S/cm or less.

4 Claims, 2 Drawing Sheets

(51) Int. Cl.
  *H01M 4/64* (2006.01)
  *H01M 50/107* (2021.01)

(56) References Cited

U.S. PATENT DOCUMENTS

2012/0204761 A1    8/2012  Aretz et al.
2016/0372799 A1*  12/2016  Watanabe

FOREIGN PATENT DOCUMENTS

| | | |
|---|---|---|
| JP | 2003-092092 A | 3/2003 |
| JP | 2013-508577 A | 3/2013 |
| JP | 2016-001601 A | 1/2016 |
| JP | 2016-066550 A | 4/2016 |
| WO | WO-2018123319 A1 * | 7/2018 ............... B60K 6/28 |
| WO | 2018/163514 A1 | 9/2018 |
| WO | WO-2019163756 A1 * | 9/2019 |

OTHER PUBLICATIONS

Oct. 4, 2022 English Translation of the Office Action issued in Japanese Patent Application No. 2020-507820.
Apr. 15, 2023 English-translation of the Office Action issued in Chinese Patent Application No. 201980019904.X.
Translation of May 6, 2024 Office Action issued in Chinese Patent Application No. 201980019904.X.

* cited by examiner

ALL-SOLID-STATE BATTERY

TECHNICAL FIELD

The present invention relates to an all-solid-state battery. Priority is claimed on Japanese Patent Application No. 2018-051192, filed Mar. 19, 2018, the content of which is incorporated herein by reference.

BACKGROUND ART

In recent years, lithium ion secondary batteries have been widely used as power supplies for mobile communication devices such as mobile phones and smartphones and portable small devices such as laptops, tablet PCs, and game machines. Lithium ion secondary batteries used in such portable small devices are being required to be smaller, thinner and more reliable. In order to drive these electronic devices for a long time, research and development of lithium ion secondary batteries having a longer lifespan and a higher capacity has been actively conducted.

Regarding lithium ion secondary batteries, those using an organic electrolytic solution as an electrolyte and those using a solid electrolyte are known. In the related art, a lithium ion secondary battery using an organic electrolytic solution as an electrolyte includes a positive electrode and a negative electrode coated with a positive electrode active material or a negative electrode active material that absorbs and releases lithium ions on both surfaces of a sheet-like current collector made of aluminum, copper or the like, and in which a separator is interposed between the positive electrode and the negative electrode and these are wound a plurality of times to form a wound body and put into an exterior body having a cylindrical, rectangular, or coin shape together with an electrolytic solution and enclosed.

In such a lithium ion secondary battery, the electrolytic solution contains a flammable organic solvent. Therefore, when an impact is applied, liquid leakage or short circuiting may occur and abnormal heat generation may be caused. Therefore, batteries having superior safety are preferable.

Compared to a lithium ion secondary battery using an organic electrolytic solution, a lithium ion secondary battery (all-solid-state battery) using a solid electrolyte as an electrolyte has a higher degree of freedom in design of the battery shape and the size and thickness of the battery are easily reduced. In addition, since an all-solid-state battery does not contain an electrolytic solution, it has an advantage of high reliability without liquid leakage, abnormal heat generation, and the like.

All-solid-state batteries are mainly classified into two types: thin film type all-solid-state batteries and bulk type all-solid-state batteries. The thin film type all-solid-state battery is produced by a thin film technique such as a PVD method and a sol-gel method. The bulk type all-solid-state battery is produced according to powder molding of an electrode active material and a sulfide-based solid electrolyte.

The thin film type all-solid-state battery has a small battery capacity because it is difficult to make an active material layer thick and difficult to make a highly laminated form. In addition, the production cost of the thin film type all-solid-state battery is high.

In the bulk type all-solid-state battery, a sulfide-based solid electrolyte is used. Hydrogen sulfide is generated when a sulfide-based solid electrolyte layer reacts with water. Therefore, the bulk type all-solid-state secondary battery needs to be produced in a glove box with a controlled dew point. In addition, it is difficult to form a sulfide solid electrolyte into a sheet. Therefore, in the bulk type all-solid-state battery, it is difficult to make the solid electrolyte layer thin and make a highly laminated battery.

Patent Literature 1 and 2 disclose a method of producing an industrially applicable all-solid-state battery in view of the above circumstances. In the method of producing an all-solid-state battery disclosed in Patent Literature 1 and 2, a technique in which an oxide-based solid electrolyte that is stable in air is used, and members are formed into sheets and laminated and then cured at the same time.

Specifically, in the method of producing an all-solid-state battery described in Patent Literature 1, a method in which an electrode layer sheet and a solid electrolyte sheet are laminated and cured, and then heated at 100° C. to remove water, and a cured laminate is then produced is disclosed. Next, a polymethylmethacrylate resin gel compound is applied to a metal lithium plate, and the coating surface and the surface on the side of the solid electrolyte layer of the cured laminate are adhered and sealed into a 2032 type coin cell to produce an all-solid-state battery.

Patent Literature 2 discloses a method of producing an all-solid-state battery having a structure in which, in order from the plane of the paper, a positive electrode current collector, a positive electrode, a part of a solid electrolyte layer, a solid electrolyte layer, a solid electrolyte layer and a negative electrode, and a negative electrode current collector are laminated.

CITATION LIST

Patent Literature

[Patent Literature 1]
Japanese Patent Application No. 2012-534547 (Published Japanese Translation No. 2013-508577 of the PCT International Publication)
[Patent Literature 2]
Japanese Unexamined Patent Application, First Publication No. 2016-66550

SUMMARY OF INVENTION

Technical Problem

However, since the all-solid-state battery described in Patent Literature 1 does not function effectively when water enters thereinto, reducing the amount of water that enters using a 2032 type coin cell has been attempted. However, the sealed interior includes water present in the atmosphere during sealing and water contained in the polymethylmethacrylate resin gel. In addition, since the 2032 type coin cell sealing material itself is not dried, water comes to be present in the sealed interior. That is, the all-solid-state battery disclosed in Patent Literature 1 has a risk of self-discharging according to a reaction with components in air (mainly water) in a positive electrode layer or negative electrode layer after charging.

The all-solid-state battery disclosed in Patent Literature 2 also has a risk of self-discharging. That is, the self-discharge characteristics of the all-solid-state batteries described in Patent Literature 1 and 2 are not sufficient.

The present invention has been made in view of the above circumstances and an object of the present invention is to provide an all-solid-state battery having improved self-discharge characteristics.

Solution to Problem

An all-solid-state battery according to an aspect of the present invention includes a positive electrode layer including a positive electrode current collector layer and a positive electrode active material layer provided on the positive electrode current collector layer; a negative electrode layer including a negative electrode current collector layer and a negative electrode active material layer provided on the negative electrode current collector layer; and a solid electrolyte layer which is arranged between the positive electrode layer and the negative electrode layer and contains a solid electrolyte, wherein the all-solid-state battery includes a power storage unit in which the positive electrode layer and the negative electrode layer face each other with the solid electrolyte layer therebetween and an exterior unit, and wherein the exterior unit has an ion conductivity of $10^{-2}$ S/cm or less.

In such a configuration, according to the structure including the exterior unit, opportunities for the positive electrode active material layer or negative electrode active material layer in a charged state to be exposed to components in air (mainly water) decrease, and thus it is possible to reduce the occurrence of energy being consumed during a reaction with components in air.

In addition, when the ion conductivity of the exterior unit is made $10^{-2}$ S/cm or less, it is possible to reduce deviation of lithium ions into the exterior unit during charging. Thereby, in an open circuit state after charging, it is possible to reduce a leakage current caused by alleviation of deviation of lithium ions into the exterior unit. Thereby, it is possible to improve self-discharge characteristics.

The self-discharge rate of the all-solid-state battery is preferably 6.5% or less, more preferably 6% or less, and still more preferably 5% or less.

In the all-solid-state battery according to the above aspect, a ratio Y of the ion conductivity of the exterior unit to the ion conductivity of the solid electrolyte layer (ion conductivity of exterior unit)/(ion conductivity of solid electrolyte layer) may be $Y \leq 1$.

In such a configuration, when a ratio Y of the ion conductivity of the exterior unit to the ion conductivity of the solid electrolyte layer (ion conductivity of exterior unit)/(ion conductivity of solid electrolyte layer) is set to $Y \leq 1$, it is possible to complete charging before deviation of lithium ions into the exterior unit during charging becomes large, and it is possible to reduce deviation of lithium ions into the exterior unit. Thereby, in an open circuit state after charging, it is possible to further reduce a leakage current caused by alleviation of deviation of lithium ions into the exterior unit, and it is possible to further improve self-discharge characteristics.

In the all-solid-state battery according to the above aspect, an ion conductivity ratio Y of the ion conductivity of the exterior unit to the ion conductivity of the solid electrolyte layer (ion conductivity of exterior unit)/(ion conductivity of solid electrolyte layer) may be $0 \leq Y \leq 1$.

In such a configuration, when the all-solid-state battery has a configuration in which a ratio of the ion conductivity of the exterior unit to the ion conductivity of the solid electrolyte layer constituting the power storage unit is $0 \leq Y1$, it is possible to complete charging before deviation of lithium ions into the exterior unit becomes large, and it is possible to further reduce deviation of lithium ions into the exterior unit. Thereby, in an open circuit state after charging, it is possible to further reduce a leakage current caused by alleviation of deviation of lithium ions into the exterior unit, and it is possible to further improve self-discharge characteristics.

In the all-solid-state battery according to the above aspect, an ion conductivity ratio Y of the ion conductivity of the exterior unit to the ion conductivity of the solid electrolyte layer (ion conductivity of exterior unit)/(ion conductivity of solid electrolyte layer) may be $10^{-6} \leq Y \leq 1$.

In such a configuration, when the all-solid-state battery has a configuration in which a ratio of the ion conductivity of the exterior unit and the ion conductivity of the solid electrolyte layer constituting the power storage unit is $10^{-6} \leq Y \leq 1$, it is possible to complete charging before deviation of lithium ions into the exterior unit becomes large, and it is possible to further reduce deviation of lithium ions into the exterior unit. Thereby, in an open circuit state after charging, it is possible to further reduce a leakage current caused by alleviation of deviation of lithium ions into the exterior unit, and it is possible to further improve self-discharge characteristics.

In the all-solid-state battery according to the above aspect, the exterior unit may be formed in at least a part other than the power storage unit part in the all-solid-state battery.

In such a configuration, when the exterior unit is provided in at least a part other than the power storage unit in the all-solid-state battery, opportunities for the positive electrode active material layer or negative electrode active material layer in a charged state to be exposed to components in air (mainly water) can be further reduced, and it is possible to further reduce deviation of lithium ions into the exterior unit during charging. Thereby, it is possible to further improve self-discharge characteristics.

In the all-solid-state battery according to the above aspect, the exterior unit may be formed of at least one selected from among oxides, alloy oxides, phosphorous oxides, sulfides, polyanion compounds, and glass.

In such a configuration, it is possible to construct a favorable bond between the exterior unit and the power storage unit while reducing deviation of lithium ions into the exterior unit, it is possible to reduce cracks due to poor bonding, and it is possible to reduce the occurrence of energy being consumed when components in air enter from the cracks and the positive electrode active material layer or the negative electrode active material layer reacts with the components in air. Thereby, it is possible to further improve self-discharge characteristics.

In the all-solid-state battery according to the above aspect, the exterior unit may have an electron conductivity of $10^{-9}$ S/cm or less.

In such a configuration, while reducing deviation of lithium ions into the exterior unit, even when a potential difference occurs in the open circuit during charging and during discharging or after charging, the exterior unit can maintain an electronically favorable insulation state and it is possible to reduce short circuiting between the exterior unit and the power storage unit. Thereby, it is possible to further improve self-discharge characteristics.

In the all-solid-state battery according to the above aspect, the exterior unit may have a porosity P of 0.4 or less.

In such a configuration, when the porosity of the exterior unit is set to be within the above range, it is possible to construct a more favorable bond with the power storage element while reducing deviation of lithium ions into the exterior unit.

Advantageous Effects of Invention

According to the present invention, it is possible to provide an all-solid-state battery having improved self-discharge characteristics.

DESCRIPTION OF EMBODIMENTS

Figure 1:
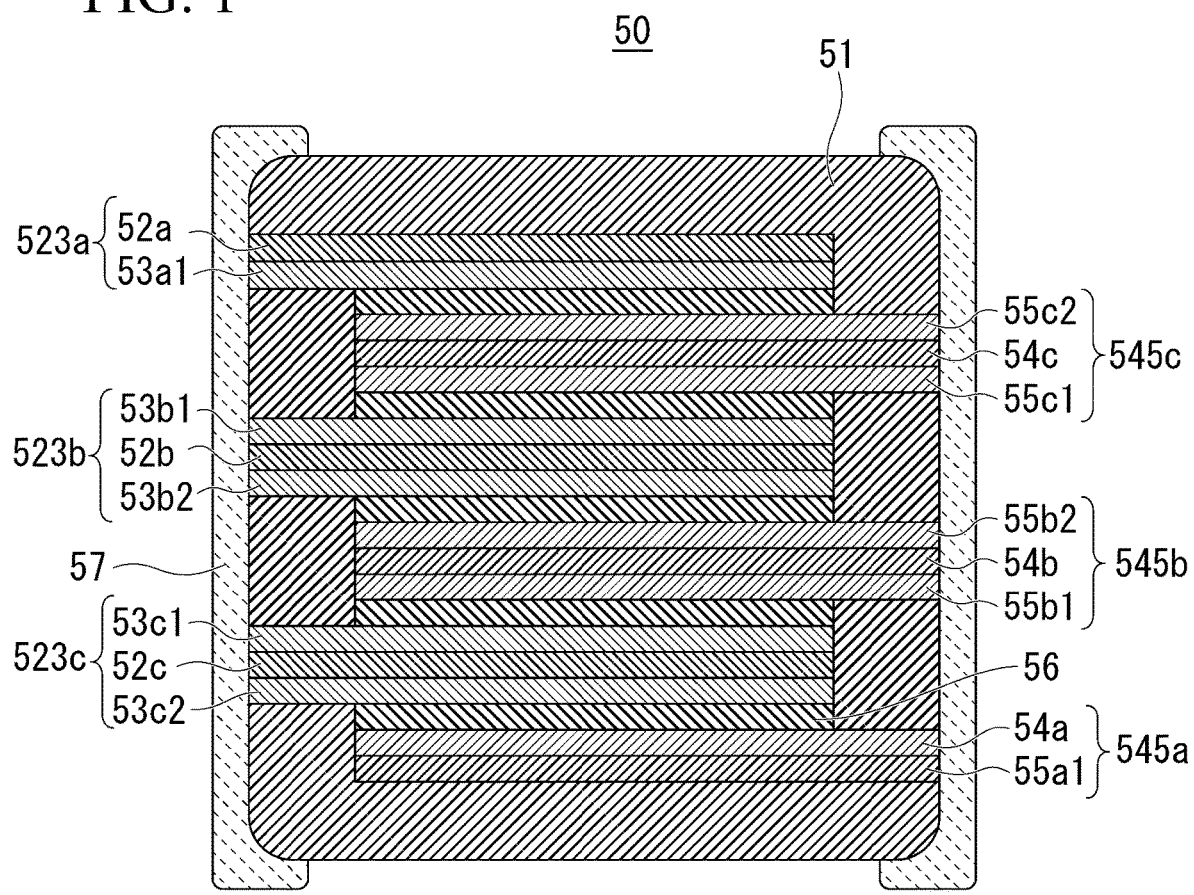
FIG. 1 is a cross-sectional schematic view schematically showing an example of an all-solid-state battery according to one embodiment of the present invention.

Preferable examples of embodiments of an all-solid-state battery and a power storage unit of the present invention will be appropriately described below in detail with reference to the drawings. In the drawings used in the following description, in order to facilitate understanding of features of the present embodiment, feature parts are enlarged for convenience of illustration in some cases, and size ratios and the like of components may be different from those of actual components. Materials, sizes, and the like exemplified in the following description are examples, and the present invention is not limited thereto, and can be realized by appropriate modifications thereof without departing from the sprit and scope of the invention. That is, the present invention is not limited to the embodiments described below, and can be appropriately modified and realized within the scope in which the effects thereof are obtained. For example, numbers, numerical values, amounts, ratios, shapes, positions, characteristics, and the like can be omitted, added, or changed without departing from the sprit and scope of the present invention.

A preferable example of an all-solid-state battery according to a first embodiment will be described below with reference to FIG. 1.

FIG. 1 is a cross-sectional schematic view schematically showing a cross section of an example of the all-solid-state battery according to the first embodiment. An all-solid-state battery 50 shown in FIG. 1 includes an exterior unit 51, a positive electrode current collector layer 52, a positive electrode active material layer 53, a negative electrode current collector layer 54, a negative electrode active material layer 55, a solid electrolyte layer 56, and a terminal electrode 57. The all-solid-state battery 50 includes one or more power storage units having a structure in which the positive electrode current collector layer 52, the positive electrode active material layer 53, the negative electrode current collector layer 54, the negative electrode active material layer 55, and the solid electrolyte layer 56 are laminated. The exterior unit 51 is arranged so that it covers parts of the power storage unit that are not connected to the terminal electrode 57.

In the all-solid-state battery 50 shown in FIG. 1, for convenience, the positive electrode current collector layers 52 may be referred to as positive electrode active materials 52*c*, 52*b*, and 52*a* in this order in the lamination direction. Similarly, the positive electrode active material layers 53 may be referred to as 53*c*2, 53*c*1, 53*b*2, 53*b*1, and 53*a*1, the negative electrode current collector layers 54 may be referred to as 54*a*, 54*b*, and 54*c*, and the positive electrode active material layers 55 may be referred to as 55*a*1, 55*a*2, 55*b*1, 55*b*2, 55*c*1, and 55*c*2. In addition, a combination of the positive electrode current collector layer 52 and the positive electrode active material layer 53 arranged on one side or both sides of the main surface thereof may be referred to as a positive electrode layer 523. For convenience, the positive electrode layers 523 may be referred to as the positive electrode layers 523*c*, 523*b*, and 523*a* in the lamination direction. Similarly, a combination of the negative electrode current collector layer 55 and the negative electrode active material layer 54 arranged on one side or both sides of the main surface thereof may be referred to as the negative electrode layer 545. The negative electrode layers 545 may be referred to as 545*a*, 545*b*, and 545*c* in the lamination direction. The outmost part of the power storage unit in the all-solid-state battery 50 includes the positive electrode current collector layer 52*a* and the negative electrode current collector layer 54*a*.

In addition, an intermediate layer allowing alleviation with respect to a coefficient of thermal expansion may be provided on at least one of a gap between the positive electrode active material layer 53 and the solid electrolyte layer 56 and a gap between the negative electrode active material layer 55 and the solid electrolyte layer 56.

The positive electrode active material layer 53 is provided on at least one side of the main surface of the positive electrode current collector layer 52 or can be provided on both sides thereof. For example, in FIG. 1, the positive electrode active material layer 53*a* is provided on one side of the main surface of the positive electrode current collector layer 52*a*, and the positive electrode active material layers 53*b*1 and 53*b*2 are provided on both sides of the main surface of the positive electrode active material layer 52*b*.

The negative electrode active material layer 55 is provided on at least one side of the negative electrode current collector layer 54 or can be provided on both sides thereof. For example, in FIG. 1, the positive electrode active material layer 55*a* is provided on one side of the main surface of the positive electrode current collector layer 54*a*, and the positive electrode active material layers 55*b*1 and 55*b*2 are provided on both sides of the main surface of the positive electrode active material layer 54*b*.

The positive electrode current collector layers 52 and the negative electrode current collector layers 54 are connected to the terminal electrodes 57 that are different from each other. When the positive electrode current collector layer 52 is connected to the terminal electrode 57 and the negative electrode current collector layer 54 is connected to the terminal electrode 57, the all-solid-state battery 50 can be electrically connected to the outside.

Figure 2:
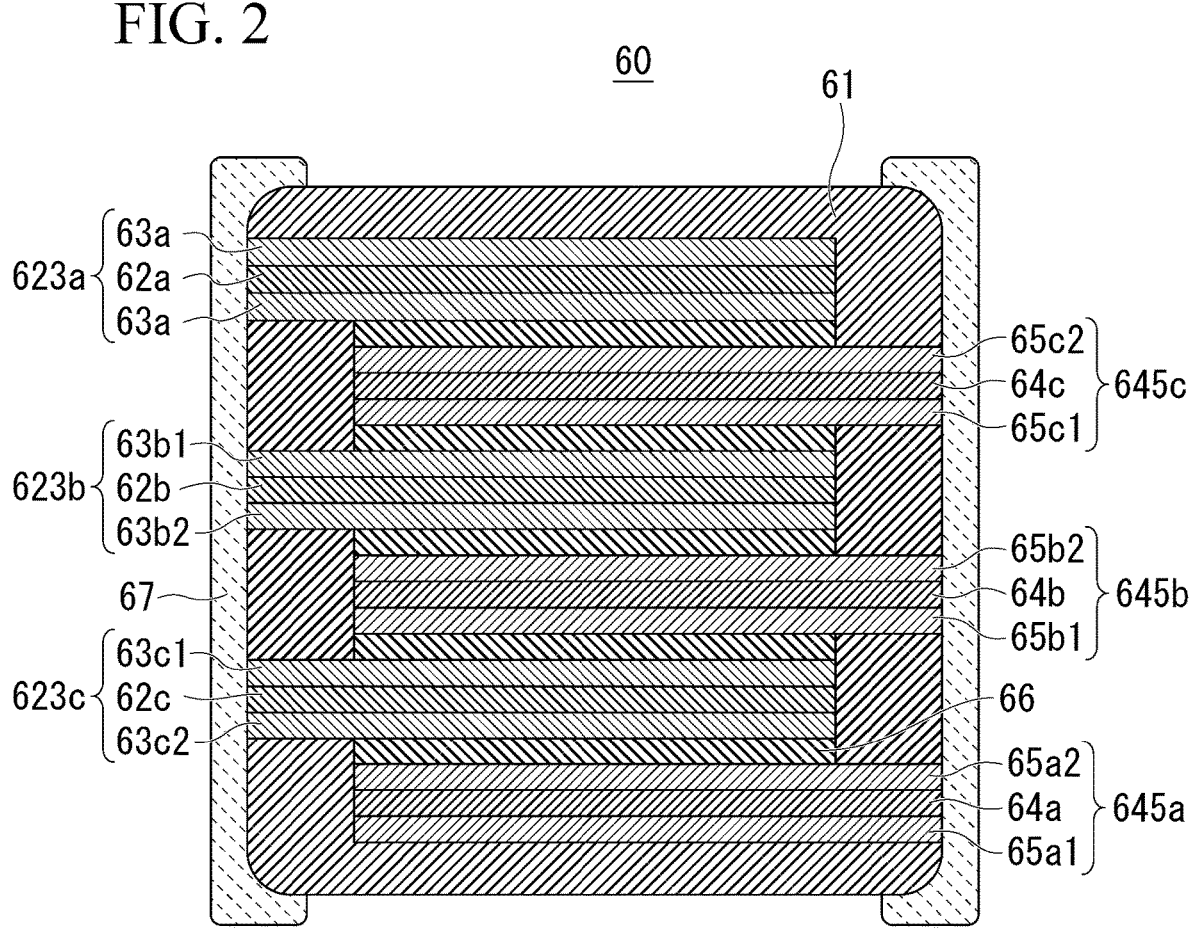
FIG. 2 is a cross-sectional schematic view schematically showing an example of an all-solid-state battery according to one embodiment of the present invention.

In addition, FIG. 2 is a cross-sectional schematic view schematically showing a cross section of an example of an all-solid-state battery according to a second embodiment. As shown in FIG. 2, an all-solid-state battery 60 includes an exterior unit 61, a positive electrode current collector layer 62, a positive electrode active material layer 63, a negative electrode current collector layer 64, a negative electrode active material layer 65, a solid electrolyte layer 66, and a terminal electrode 67. The all-solid-state battery 60 includes the exterior unit 61, the positive electrode current collector layer 62, the positive electrode active material layer 63, the negative electrode current collector layer 64, the negative electrode active material layer 65, the solid electrolyte layer 66, and the terminal electrode 67. The all-solid-state battery 60 includes one or more power storage units having a structure in which the positive electrode current collector layer 62, the positive electrode active material layer 63, the negative electrode current collector layer 64, the negative electrode active material layer 65, and the solid electrolyte layer 66 are laminated. The outmost part of the power storage unit in the all-solid-state battery 60 includes the positive electrode active material layer 63a and the negative electrode active material layer 65a. The exterior unit 61 is arranged so that it covers parts of the power storage unit that are not connected to the terminal 67.

In addition, an intermediate layer for allowing alleviation with respect to a coefficient of thermal expansion may be provided on at least one of a gap between the positive electrode active material layer 63 and the solid electrolyte 66 and a gap between the negative electrode active material layer 65 and the solid electrolyte 66.

The positive electrode current collector layers 62 and the negative electrode current collector layers 64 are connected to the terminal electrodes 67 that are different from each other. With this configuration, an electrical connection to the outside is possible.

Figure 3:
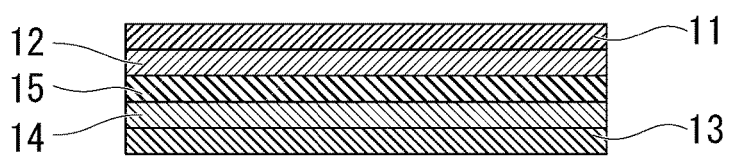
FIG. 3 is a cross-sectional schematic view schematically showing an example of a power storage unit according to one embodiment of the present invention.

FIG. 3 is a cross-sectional view showing an example of a power storage unit according to the present embodiment. As shown in FIG. 3, a power storage unit 10 includes a positive electrode current collector layer 11, a positive electrode active material layer 12, a negative electrode current collector layer 13, a negative electrode active material layer 14, and a solid electrolyte layer 15, and has a structure in which these are laminated.

The all-solid-state battery 50 in the present embodiment is an all-solid-state battery including a power storage unit and an exterior unit. The power storage unit includes a positive electrode layer composed of the positive electrode current collector layer 52 and the positive electrode active material layer 53 provided on the positive electrode current collector layer 52, a negative electrode layer composed of the negative electrode current collector layer 54 and the negative electrode active material layer 55 provided on the negative electrode current collector layer 54, and the solid electrolyte layer 56 which is arranged between the positive electrode layer and the negative electrode layer and contains a solid electrolyte. The ion conductivity of the exterior unit is preferably $10^{-2}$ S/cm or less.

In such a configuration, according to the structure including the exterior unit 51, opportunities for the positive electrode active material layer 53 or negative electrode active material layer 55 in a charged state to be exposed to components (mainly water) in air decrease. That is, it is possible to reduce the occurrence of energy being consumed during a reaction with components in air.

In addition, when the exterior unit 51 having an ion conductivity of $10^{-2}$ S/cm or less is provided, it is possible to reduce deviation of lithium ions into the exterior unit 51 during charging. Thereby, in an open circuit state after charging, it is possible to reduce a leakage current caused by alleviation of deviation of lithium ions into the exterior unit 51. Thereby, it is possible to improve self-discharge characteristics.

In the all-solid-state battery 50 in the present embodiment, a ratio Y of the ion conductivity of the exterior unit 51 to the ion conductivity of the solid electrolyte layer 56 (ion conductivity of exterior unit)/(ion conductivity of solid electrolyte layer) is preferably Y≤1.

In such a configuration, when the ratio Y of the ion conductivity of the exterior unit 51 to the ion conductivity of the solid electrolyte layer 56 (ion conductivity of the exterior unit 51)/(ion conductivity of the solid electrolyte layer 56) is within the above range, it is possible to complete charging before deviation of lithium ions into the exterior unit 51 during charging becomes large. That is, it is possible to reduce deviation of lithium ions into the exterior unit 51. Thereby, in an open circuit state after charging, it is possible to further reduce a leakage current caused by alleviation of deviation of lithium ions into the exterior unit 51, and it is possible to further improve self-discharge characteristics.

In the all-solid-state battery 50 in the present embodiment, a ratio Y of the ion conductivity of the exterior unit 51 to the ion conductivity of the solid electrolyte layer 56 (ion conductivity of exterior unit)/(ion conductivity of solid electrolyte layer) is preferably 0≤Y≤1. In addition, a ratio Y of the ion conductivity of the exterior unit 51 to the ion conductivity of the solid electrolyte layer 56 is more preferably $10^{-6} \leq Y \leq 1$. In addition, a ratio Y of the ion conductivity of the exterior unit 51 to the ion conductivity of the solid electrolyte layer 56 is still more preferably $10^{-6} \leq Y \leq 10^{-2}$.

In such a configuration, when the all-solid-state battery has a configuration in which a ratio of the ion conductivity of the exterior unit 51 to the ion conductivity of the solid electrolyte layer 56 constituting the power storage unit is set to be within the above range, it is possible to complete charging before deviation of lithium ions into the exterior unit 51 becomes large, and it is possible to further reduce deviation of lithium ions into the exterior unit 51. Thereby, in an open circuit state after charging, it is possible to further reduce a leakage current caused by alleviation of deviation of lithium ions into the exterior unit 51, and it is possible to further improve self-discharge characteristics.

In the all-solid-state battery 50 according to the present embodiment, the exterior unit 51 is preferably formed in at least a part other than the power storage unit part.

In such a configuration, when the exterior unit 51 is provided in at least a part other than the power storage unit of the all-solid-state battery 50, opportunities for the positive electrode active material layer 53 or negative electrode active material layer 55 in a charged state to be exposed to components (mainly water) in air can be further reduced. In addition, it is possible to further reduce deviation of lithium ions into the exterior unit 51 during charging. Thereby, it is possible to further improve self-discharge characteristics.

In the all-solid-state battery 50 in the present embodiment, the exterior unit 51 is formed of at least one selected from among oxides, alloy oxides, phosphorous oxides, sulfides, polyanion compounds, and glass.

In such a configuration, it is possible to construct a favorable bond between the exterior unit 51 and the power storage unit while reducing deviation of lithium ions into the exterior unit. That is, it is possible to reduce cracks due to poor bonding, it is possible to further reduce opportunities for components in air to enter from cracks and the positive electrode active material layer 53 or the negative electrode active material layer 55 to be exposed to components in air (mainly water), and thus it is possible to reduce the occurrence of energy being consumed during a reaction with components in air. Thereby, it is possible to further improve self-discharge characteristics.

In the all-solid-state battery 50 in the present embodiment, the electron conductivity of the exterior unit 51 is preferably $10^{-9}$ S/cm or less and more preferably $10^{-11}$ or less.

In such a configuration, while reducing deviation of lithium ions into the exterior unit 51, even when a potential difference occurs in the open circuit during charging and discharging or after charging, the exterior unit 51 can maintain an electronically favorable insulation state and it is possible to reduce short circuiting between the exterior unit 51 and the power storage unit. Thereby, it is possible to further improve self-discharge characteristics.

In the present embodiment, the porosity P of the exterior units 51 and 61 is preferably 0.4 or less and more preferably 0.2 or less.

In this specification, "porosity" indicates a ratio of a total area of void parts to a total area of the exterior unit in an image of a cross section of the laminate parallel to the lamination direction. The porosity shown in examples is calculated by the following method. A cross section of the laminate cut and processed by a cross section polisher (CP) parallel to the lamination direction is observed under a scanning electron microscope (SEM). 10 locations in the cross section including the exterior unit are observed at a magnification of 1,000, and the porosity is calculated from the obtained SEM images using image processing software. The exterior unit in the SEM image is extracted by trimming and converted into a monochrome image and binarized, the void parts are colored black, and other parts are colored white, and the numbers of pixels thereof are calculated. The number of pixels of the void parts is added to the number of pixels of other parts to calculate the number of pixels of the extracted exterior unit. Then, the porosity P of the exterior unit is calculated by the following formula.

Porosity $P$ of exterior unit=number of pixels of void parts÷(number of pixels of void parts and other parts)

(Control of Porosity)

A porosity control method is not particularly limited, and the porosity can be controlled according to a type and particle size of a sintering aid and control of an amount added, a type and particle size of a sintering inhibitor and control of an amount added, a type and particle size of a void forming material and an amount added, control of a molding density of a molded product, control of curing conditions (a heating rate, a curing temperature, a holding time, a cooling rate, and a type and flow rate of a gas), or combinations thereof.

According to the configuration, when the porosity of the exterior units 51 and 61 is set to be within the above range, it is possible to construct a more favorable bond with the power storage element while reducing deviation of lithium ions into the exterior units 51 and 61, it is possible to reduce entering of components in air from cracks caused by poor bonding, and it is possible to reduce a leakage current. Thereby, it is possible to further improve self-discharge characteristics.

In the all-solid-state battery 50 in the present embodiment, the power storage unit includes a positive electrode layer composed of the positive electrode current collector layer 52 and the positive electrode active material layer 53 provided on the positive electrode current collector layer 52, a negative electrode layer composed of the negative electrode current collector layer 54 and the negative electrode active material layer 55 provided on the negative electrode current collector layer 54, and the solid electrolyte layer 56 which is arranged between the positive electrode layer and the negative electrode layer and contains a solid electrolyte. The relative density of the exterior unit 51 is preferably 80% or more and more preferably 90% or more.

In such a configuration, according to the all-solid-state battery 50 having a relative density in the above range, it is possible to obtain the all-solid-state battery 50 having improved self-discharge characteristics and a longer cycle lifespan.

The compositions of the positive electrode current collector layer 52 and the negative electrode current collector layer 54 are not particularly limited. For example, a positive electrode active material, a negative electrode active material, a solid electrolyte, and a sintering aid may be contained at an arbitrary ratio in addition to a current collector material.

The compositions of the positive electrode active material layer 53 and the negative electrode active material layer 55 are not particularly limited. For example, a lithium ion conduction additive, a sintering aid, and a conductive agent may be contained in addition to a positive electrode active material and a negative electrode active material.

The composition of the solid electrolyte layer 56 is not particularly limited. For example, a sintering aid may be contained in addition to a solid electrolyte.

The positive electrode active material and the negative electrode active material constituting the positive electrode active material layer 53 and the negative electrode active material layer 55 are used according to comparison of potentials of respective compounds. Specifically, among respective compounds, a compound exhibiting a higher potential can be used as the positive electrode active material, and a compound exhibiting a lower potential can be used as the negative electrode active material. In addition, the positive electrode active material layer 53 and the negative electrode active material layer 55 may be composed of one type of compound or composed of a plurality of compounds.

(Solid Electrolyte)

Regarding the solid electrolyte constituting the solid electrolyte layers 56, 66, and 15 of the all-solid-state battery of the present embodiment, a material having a low electron conductivity and a high lithium ion conductivity is preferably used. The present invention is not limited to these examples, and for example, at least one selected from the group consisting of perovskite type compounds such as $La_{0.5}Li_{0.5}TiO_3$. LISICON-type compounds such as $Li_{14}Zn(GeO_4)_4$, garnet type compounds such as $Li_7La_3Zr_2O_{12}$, phosphate compounds such as $LiTi_2(PO_4)_3$, $LiGe_2(PO_4)_3$, $LiZr_2(PO_4)_3$ (monoclinic crystal), $LiZr_2(PO_4)_3$ (rhombohedral crystal), $Li_{1.5}Ca_{0.5}Zr_{1.5}(PO_4)_3$, $Li_{1.3}Al_{0.3}Ti_{1.7}(PO_4)_3$, $Li_{1.5}Al_{0.5}Ge_{1.5}(PO_4)_3$, $Li_3PO_4$, $Li_{3.5}Si_{0.5}P_{0.5}O_4$ and $Li_{2.9}PO_{3.3}N_{0.46}$, thio-LISICON-type compounds such as $Li_{3.25}Ge_{0.25}P_{0.75}S_4$ and $Li_3PS_4$, and glass compounds such as $Li_2S-P_2S_5$ and $Li_2O-V_2O_5-SiO_2$ is preferably used.

In order to form a thin and dense layer, the particle size of the solid electrolyte constituting the solid electrolyte layer of the all-solid-state battery of the present embodiment is preferably 0.05 μm or more and 5 μm or less and more preferably 0.1 μm or more and 2.5 μm or less.

The thickness of the solid electrolyte layers 56, 66, and 16 is not particularly limited, and in order to realize high rate characteristics while maintaining self-discharge characteristics, it is preferably 0.1 to 100 more preferably 0.3 to 20 and still more preferably 0.6 to 10 μm.

When the thickness of the solid electrolyte layers 56, 66, and 16 is set to be within the above range, it is possible to reduce a distance of movement of lithium ions during charging and discharging while maintaining insulation properties of the solid electrolyte layers 56, 66, and 16, and it is possible to reduce the internal resistance.

(Positive Electrode Active Material)

Regarding the positive electrode active material contained in the positive electrode active material layers 53, 63, and 12, the positive electrode current collector layers 52, 62, and 11 according to the present embodiment, for example, a lithium-containing compound such as lithium oxide, lithium sulfide, or an intercalation compound containing lithium is suitable, and two or more thereof may be used in combination. In particular, in order to increase the energy density, a lithium composite oxide represented by a general formula $Li_xMO_2$ or an intercalation compound containing lithium is preferably used for the positive electrode active material layers 53, 63, and 12. Here, M is preferably at least one type of transition metal, and specifically preferably at least one of Co, Ni, Mn, Fe, Al, V, and Ti. x varies depending on the charge and discharged state of the battery and is generally a value in a range of $0.05 \leq x \leq 1.10$. In addition, manganese spinel ($LiMn_2O_4$) having a spinel type crystal structure, lithium iron phosphate ($LiFePO_4$) having an olivine type crystal structure, $LiCoPO_4$, $LiNiPO_4$, and the like are preferably used because in this case a high energy density can be obtained.

Specifically, regarding the positive electrode active material constituting the positive electrode active material layers 53, 63, and 12 of the all-solid-state batteries 50 and 60, the power storage unit 10, a material that efficiently releases and adsorbs lithium ions is preferably used. For example, a transition metal oxide or a transition metal composite oxide is preferably used. Specifically, any of a lithium manganese composite oxide $Li_2Mn_{x3}Ma_{1-x3}O_3$ ($0.8 \leq x \leq 31$, Ma=Co, Ni), lithium cobalt oxide ($LiCoO_2$), lithium nickel oxide ($LiNiO_2$), lithium manganese spinel ($LiMn_2O_4$), a composite metal oxide represented by a general formula: $LiNi_{x4}Co_{y4}Mn_{z4}O_2$ ($x4+y4+z4=1$, $0 \leq x4 \leq 1$, $0 \leq y4 \leq 1$, $0 \leq z4 \leq 1$), the lithium vanadium compound ($LiV_2O_5$), olivine type $LiMbPO_4$ (wherein, Mb is at least one type of element selected from among Co, Ni, Mn, Fe, Mg, Nb, Ti, Al, and Zr), lithium vanadium phosphate ($Li_3V_2(PO_4)_3$ or $LiVOPO_4$), a Li-rich solid solution positive electrode $Li_2MnO_3$-$LiMcO_2$ (Mc=Mn, Co, Ni), lithium titanate ($Li_4Ti_5O_{12}$), and a composite metal oxide represented by $LiaNi_{x5}Co_{y5}Al_{z5}O_2$ ($0.9<a<1.3$, $0.9<x5+y5+z5<1.1$) is preferably used. In addition, the positive electrode active material constituting the positive electrode active material layers 53, 63, and 12 is not limited to these materials, and any other positive electrode active material materials that electrochemically insert and release lithium ions can be used.

In order to form a dense and thin positive electrode active material layer, the particle size of the positive electrode active material constituting the positive electrode active material layers 53, 63, and 12 according to the present embodiment is preferably 0.05 μm or more and 5 μm or less and more preferably 1 μm or more and 2.5 μm or less.

The thickness of the positive electrode active material layers 53, 63, and 12 is not particularly limited, and in order to obtain an all-solid-state battery having a high capacity and a high output while improving self-discharge characteristics, it is preferably 0.1 to 100 more preferably 0.3 to 10 and still more preferably 0.6 to 5

(Negative Electrode Active Material)

Regarding the negative electrode active material contained in the negative electrode active material layers 55, 65, and 14 according to the present embodiment, in order to obtain an all-solid-state battery having a high weight energy density and volume energy density, a material having a low potential with respect to lithium and a large capacity per weight is preferably used. The present invention is not limited to these examples, and for example, those containing at least one of at least one metal selected from the group consisting of Li, Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V and Zn, alloys composed of two or more of these metals, oxides of the above metals, phosphorous oxides, oxides of the above alloys, and phosphorous oxides or a carbon material are preferable.

In order to form a dense and thin negative electrode active material layer, the particle size of the negative electrode active material constituting the negative electrode active material layers 55, 65, and 14 according to the present embodiment is preferably 0.05 μm or more and 5 μm or less and more preferably 0.1 μm or more and 2.5 μm or less.

The thickness of the negative electrode active material layers 55, 65, and 14 is not particularly limited, and in order to obtain an all-solid-state battery having a higher capacity and a longer cycle lifespan while improving self-discharge characteristics, it is preferably 0.1 to 100 μm, more preferably 0.5 to 10 μm, and still more preferably 1 to 5 μm.

(Exterior Unit Material)

Regarding the exterior unit material constituting the exterior units 51 and 61 of the all-solid-state battery of the present embodiment, an exterior unit material having a low electron conductivity and a lower lithium ion conductivity equal to or lower than the lithium ion conductivity of the solid electrolyte constituting the solid electrolyte layers 56, 66, and 15 is preferably used. The present invention is not limited to these examples, and for example, at least one selected from the group consisting of perovskite type compounds such as $La_{0.5}Li_{0.5}TiO_3$, LISICON-type compounds such as $Li_{14}Zn(GeO_4)_4$, garnet type compounds such as $Li_7La_3Zr_2O_{12}$, phosphate compounds such as $LiTi_2(PO_4)_3$, $LiGe_2(PO_4)_3$, $LiZr_2(PO_4)_3$ (monoclinic crystal), $LiZr_2(PO_4)_3$ (rhombohedral crystal), $Li_{1.5}Ca_{0.5}Zr_{1.5}(PO_4)_3$, $Li_{1.3}Al_{0.3}Ti_{1.7}(PO_4)_3$, $Li_{1.5}Al_{0.5}Ge_{1.5}(PO_4)_3$, $Li_3PO_4$, $Li_{3.5}Si_{0.5}P_{0.5}O_4$ and $Li_{2.9}PO_{3.3}N_{0.46}$, thio-LISICON-type compounds such as $Li_{3.25}Ge_{0.25}P_{0.75}S_4$, $Li_3PS_4$, $Li_2S$—$P_2S_5$ and $Li_2O$—$V_2O_5$—$SiO_2$, glass compounds such as borate glass, silicate glass, and borosilicate glass, and oxides such as $ZrO_2$, $Al_2O_3$, and $SiO_2$ is preferably used.

The particle size of the exterior unit material constituting the exterior unit of the all-solid-state battery of the present embodiment is preferably 0.05 μm or more and 5 μm or less and more preferably 0.1 μm or more and 2.5 μm or less in order to form a dense layer.

The thickness of the exterior units 51 and 61 of the all-solid-state battery of the present embodiment is not particularly limited, and in order to obtain an all-solid-state battery having a longer cycle lifespan while reducing entry from the atmosphere and improving self-discharge characteristics, it is preferably 0.1 to 1000 μm and more preferably 1 to 500 μm.

(Conductive Agent)

A conductive agent may be added to the positive electrode active material layers 53, 63, and 12 and the negative electrode active material layers 55, 65, and 14 according to the present embodiment. When a conductive agent is added to the positive electrode active material layers 53, 63, and 12 and the negative electrode active material layers 55, 65, and 14, it is possible to improve the conductivity. The conductive agent used in the present embodiment is not particularly limited, and known materials can be used. The conductive agents added to the positive electrode active material layer and the negative electrode active material layer may be the same as or different from each other.

When a conductive agent is used for the positive electrode active material layers 53, 63, and 12 and the negative electrode active material layers 55, 65, and 14, a conductive agent having high conductivity is preferably used. For example, silver, palladium, a silver-palladium alloy, gold, platinum, aluminum, copper, nickel, carbon, and the like are preferably used.

In order to improve an electronic connection between the positive electrode active material and the positive electrode current collector layer or between the negative electrode active material and the negative electrode current collector layer, the particle size of the conductive agent is preferably 0.02 µm or more and 2 µm or less and more preferably 0.05 µm or more and 1 µm or less.

In addition, the ratio of the conductive agents added is not particularly limited as long as the positive electrode active material or the negative electrode active material contained in the positive electrode active material layers 53, 63, and 12 or the negative electrode active material layers 55, 65, and 14 functions electrochemically. Preferably, the volume ratio of the positive electrode active material/the conductive agent or the negative electrode active material/the conductive agent is in a range of 100/0 to 60/40, and more preferably in a range of 85/15 to 75/25. When the ratio of the conductive agents is set to be within the above range, it is possible to obtain an all-solid-state battery having a higher capacity and a higher output while improving self-discharge characteristics, and it is possible to reduce the electrical resistance.

(Lithium Ion Conduction Additive)

A lithium ion conduction additive may be added to the positive electrode active material layers 53, 63, and 12 and the negative electrode active material layers 55, 65, and 14 according to the present embodiment. With the configuration, it is possible to improve lithium ion conductivity. The lithium ion conduction additive used in the present embodiment is not particularly limited, and known materials can be used. The lithium ion conduction additives added to the positive electrode active material layer and the negative electrode active material layer may be the same as or different from each other.

Regarding the lithium ion conduction additive, a material having high lithium ion conductivity is preferably used. The present invention is not limited to these examples, and for example, at least one selected from the group consisting of perovskite type compounds such as $La_{0.5}Li_{0.5}TiO_3$, LISICON-type compounds such as $Li_{14}Zn(GeO_4)_4$, garnet type compounds such as $Li_7La_3Zr_2O_{12}$, phosphate compounds such as $LiTi_2(PO_4)_3$, $LiGe_2(PO_4)_3$, $LiZr_2(PO_4)_3$ (monoclinic crystal), $LiZr_2(PO_4)_3$ (rhombohedral crystal), $Li_{1.5}Ca_{0.5}Zr_{1.5}(PO_4)_3$, $Li_{1.3}Al_{0.3}Ti_{1.7}(PO_4)_3$, $Li_{1.5}Al_{0.5}Ge_{1.5}(PO_4)_3$, $Li_3PO_4$, $Li_{3.5}Si_{0.5}P_{0.5}O_4$, $Li_{2.9}PO_{3.3}N_{0.46}$, and lithium phosphate, thio-LISICON-type compounds such as $Li_{3.25}Ge_{0.25}P_{0.75}S_4$ and $Li_3PS_4$, oxides such as LiPON, lithium niobate, lithium silicate, and lithium borate, and glass compounds such as $Li_2S—P_2S_5$ and $Li_2O—V_2O_5—SiO_2$ is preferably used.

In order to improve movement of lithium ions between the positive electrode active material layers 53, 63, and 12 and the solid electrolyte layers 56, 66, and 15 or between the negative electrode active material layers 55, 65, and 14 and the solid electrolyte layers 56, 66, and 15, the particle size of the lithium ion conduction additive is preferably 0.02 µm or more and 2 µm or less, more preferably 0.05 µm or more and 1 µm or less, and still more preferably 0.1 µm or more and 0.5 µm or less.

In addition, the ratio of the lithium ion conduction additives added is not particularly limited as long as the positive electrode active material or the negative electrode active material contained in the positive electrode active material layers 53, 63, and 12 or the negative electrode active material layers 55, 65, and 14 functions electrochemically.

For example, in order to obtain an all-solid-state battery having a higher capacity and a higher output while improving self-discharge characteristics, the volume ratio of the positive electrode active material/the lithium ion conduction additive, or the negative electrode active material/the lithium ion conduction additive is preferably in a range of 100/0 to 60/40 and more preferably in a range of 85/15 to 75/25 in order to reduce the internal resistance.

(Current Collector Material)

Regarding specific examples of current collector materials constituting the positive electrode current collector layers 52, 62, and 12 and the negative electrode current collector layers 54, 64, and 13, gold (Au), platinum (Pt), platinum (Pt)-palladium (Pd), silver (Ag), silver (Ag)-palladium (Pd), aluminum (Al), copper (Cu), nickel (Ni), or an indium-tin oxide film (ITO) is preferable.

In addition, the positive electrode current collector layers 52, 62, and 11 and the negative electrode current collector layers 54, 64, and 13 may contain a positive electrode active material and a negative electrode active material, respectively. The content ratio of the active materials contained in the respective current collectors is not particularly limited as long as they function as a current collector. For example, the volume ratio of the positive electrode current collector material/the positive electrode active material or the negative electrode current collector material/the negative electrode active material is preferably in a range of 95/5 to 70/30, and more preferably in a range of 90/10 to 75/25.

When the positive electrode current collector layers 52, 62, and 11 and the negative electrode current collector layers 54, 64, and 13 contain a positive electrode active material and a negative electrode active material, respectively, this is preferable because the adhesion between the positive electrode current collector layers 52, 62, and 11 and the positive electrode active material layer, and between the negative electrode current collector layers 54, 64, and 13 and the negative electrode active material layer is improved and cracks are reduced.

(Sintering Aid)

The type of the sintering aid added to the exterior units 51 and 61, the positive electrode current collector layers 52 and 62, the positive electrode active material layers 53 and 63, the negative electrode current collector layers 54 and 64, the negative electrode active material layers 55 and 65, and the solid electrolyte layers 56 and 66 constituting the all-solid-state batteries 50 and 60 is not particularly limited as long as it is possible to lower a sintering temperature. The present invention is not limited to these examples, and for example, a lithium compound such as lithium carbonate, lithium hydroxide, and lithium phosphate, a boron compound such as $H_3BO_3$, or a compound composed of lithium and boron is preferably used. These materials are preferable because compound forms are unlikely to change due to water or carbon dioxide and thus they can be weighed out in air and it is possible to add lithium and boron easily and accurately.

(Void Forming Material)

The type of the void forming material added to the exterior units 51 and 61, the positive electrode active material layers 53 and 63, the negative electrode active material layers 55 and 65, and the solid electrolyte layers 56 and 66 constituting the all-solid-state batteries 50 and 60 is not particularly limited as long as voids can be introduced. The present invention is not limited to these examples, and for example, a material that decomposes or sublimates due to heat during curing, a water-soluble material, and the like are used. Regarding the water-soluble material, any material, for example, saccharides such as sucrose, glucose, and fructose, and a water-soluble polymer such as carboxymethyl cellulose and alginic acid may be used as long as they are soluble in water and washable with water. These materials are preferable because they can be weighed out in air and can be added accurately due to ease of handling.

(Terminal Electrode)

A material having high conductivity is preferably used for the terminal electrodes 57 and 67 of the all-solid-state batteries 50 and 60. For example, silver, gold, platinum, aluminum, copper, tin, or nickel can be used. The terminal electrodes 57 and 67 may have a single layer or a plurality of layers.

(Method of Producing All-Solid-State Battery)

The all-solid-state batteries 50 and 60 can be produced using, for example, a simultaneous curing method or a sequential curing method. The simultaneous curing method is a method in which materials for forming layers are laminated and cured simultaneously to produce a laminate. The sequential curing method is a method in which layers are sequentially produced, and a curing process is performed whenever each layer is produced. When the simultaneous curing method is used, it is possible to reduce the number of operation processes of the all-solid-state batteries 50 and 60. Hereinafter, a method of producing the all-solid-state batteries 50 and 60 will be described using an example using the simultaneous curing method. As described above, the method of producing the all-solid-state batteries 50 and 60 is not limited to the simultaneous curing method, and the sequential curing method may be used for production.

First, materials of the exterior units 51 and 61, the positive electrode current collector layers 52 and 62, the positive electrode active material layers 53 and 63, the solid electrolyte layers 56 and 66, the negative electrode current collector layers 54 and 64, and the negative electrode active material layers 55 and 65 constituting the all-solid-state batteries 50 and 60 are formed into a paste.

The pasting method is not particularly limited. Although not limited to such an example, for example, a paste is obtained by mixing powders of materials in a vehicle. Here, the vehicle is a general term for a medium in a liquid phase. The vehicle generally contains a solvent, a dispersant, and a binder. According to such a method, a paste for an exterior unit, a paste for a positive electrode current collector layer, a paste for a positive electrode active material layer, a paste for a solid electrolyte layer, a paste for a negative electrode current collector layer, and a paste for a negative electrode active material layer are produced.

The composition of the paste for a positive electrode current collector layer and the paste for a negative electrode current collector layer is not particularly limited, and for example, a positive electrode active material, a negative electrode active material, a solid electrolyte, and a sintering aid may be contained in addition to the current collector material.

The composition of the paste for a positive electrode active material layer and the paste for a negative electrode active material layer is not particularly limited, and for example, a solid electrolyte, a sintering aid, a conductive agent, a lithium ion conduction additive, and a void forming material may be contained in addition to the positive electrode active material or the negative electrode active material.

The composition of the paste for a solid electrolyte layer is not particularly limited, and for example, a sintering aid and a void forming material may be contained in addition to the solid electrolyte.

The composition of the paste for an exterior unit is not particularly limited, and for example, a sintering aid and a void forming material may be contained in addition to the exterior unit material.

The produced paste for an exterior unit and paste for a solid electrolyte layer are applied to a base material such as a polyethylene terephthalate (PET) in a desired order and dried as necessary to obtain a green sheet for an exterior unit and a green sheet for a solid electrolyte layer. A paste application method is not particularly limited, and known methods such as screen printing, application, transferring, and a doctor blade method can be used.

The paste for a positive electrode active material layer and the paste for a positive electrode current collector layer are screen-printed on the produced green sheet for a solid electrolyte layer or green sheet for an exterior unit in a predetermined order to form a positive electrode active material layer and a positive electrode current collector layer, and thereby a positive electrode layer green sheet is produced. Here, in some cases, change to a screen of a pattern that is not printed on the printed positive electrode active material layer and positive electrode current collector layer is performed, and the paste for an exterior unit may be printed on the unprinted part on the positive electrode layer green sheet.

Similarly, for a negative electrode, a paste for a negative electrode active material layer and a paste for a negative electrode current collector layer are screen-printed on the produced green sheet for a solid electrolyte layer or green sheet for an exterior unit in a predetermined order to form a negative electrode active material layer and a negative electrode current collector layer, and thereby a negative electrode layer green sheet is produced. Here, in some cases, change to a screen of a pattern that is not printed on the printed negative electrode active material layer and negative electrode current collector layer is performed, and the paste for an exterior unit may be printed on the unprinted part on the negative electrode layer green sheet.

After a desired number of green sheets for an exterior unit are laminated, the produced positive electrode layer green sheet and negative electrode layer green sheet are shifted and laminated in a desired order so that the positive electrode current collector layer of the positive electrode layer green sheet extends only to one end surface and the negative electrode current collector layer of the negative electrode layer green sheet extends only to the other surface, and then a desired number of green sheets for an exterior unit are laminated once again to obtain a temporary laminate.

When a parallel type or series-parallel type all-solid-state battery is produced, in order to perform lamination accurately so that an end surface of the positive electrode active material layer and an end surface of the negative electrode active material layer do not match, lamination is preferably performed by alignment and stacking. In addition, the laminated structure is not limited thereto.

The produced temporary laminate is compressed at once to produce a laminate. Compression is performed while heating, and a heating temperature is, for example, 40 to 90° C.

As necessary, the obtained laminate is aligned and cut to produce a laminate that is separated into pieces with a desired size. The cutting method is not limited, and dicing, knife cutting or the like may be performed.

Before the laminate that is separated into pieces is cured, chamfering may be performed by a dry green barrel or a wet green barrel.

When the dry green barrel is used, an abrasive such as alumina, zirconia or resin beads may be used together.

When the wet green barrel is used, a solvent is used in addition to the abrasive such as alumina, zirconia or resin beads. In this case, regarding the solvent, for example, deionized water, pure water, a fluorine-based solvent, or the like can be used.

When a water-soluble void forming material is used, washing with water can also be performed using deionized water or pure water when the wet green barrel is used.

When the dry green barrel is used in place of the wet green barrel, washing with deionized water or pure water is subsequently performed, and thus the water-soluble void forming material can be removed.

For example, the laminate that is separated into pieces is heated and cured under a nitrogen atmosphere to obtain a sintered product. In production of the all-solid-state batteries 50 and 60 of the present embodiment, a curing temperature is preferably in a range of 600 to 1,200° C. This is because, when the temperate is lower than 600° C., curing does not progress sufficiently, and when the temperate exceeds 1,200° C., problems such as dissolution of the current collector material and changes in the structures of the positive electrode active material and the negative electrode active material occur. In addition, a range of 700 to 1,000° C. is more preferable. When the temperature is set to be within a range of 700 to 1,000° C., it is more suitable for promoting curing and reducing production cost. A curing time is, for example, 10 minutes to 3 hours.

The obtained sintered product is put into a cylindrical container together with a polishing material such as alumina or resin beads and may be subjected to barrel polishing. Thereby, it is possible to chamfer corners of the sintered product. As another method, sandblasting may be used for polishing. This method is preferable because only a specific part can be cut.

When the terminal electrodes 57 and 67 are not formed before curing, known methods such as a sputtering method, a dipping method, a spray coating method are used for the obtained sintered product, and thereby the terminal electrodes 57 and 67 can be formed. When terminal electrodes are formed only in predetermined parts, they can be formed by, for example, masking with tape.

A method of forming the terminal electrodes 57 and 67 is not limited, and specific examples of materials that can be used for the terminal electrodes 57 and 67 include gold (Au), platinum (Pt), platinum (Pt)-palladium (Pd), silver (Ag), silver (Ag)-palladium (Pd), aluminum (Al), copper (Cu), indium, and an indium-tin oxide film (ITO).

In addition, in a method of forming the terminal electrodes 57 and 67, a terminal electrode may be formed using a thermosetting conductive paste obtained by mixing particles of the conductive material with a thermosetting resin and forming it into a paste.

The terminal electrodes 57 and 67 may be plated. A plating method and the type of the coating are not particularly limited, and for example, a Ni—Sn coating in which a Ni coating is formed by electroless Ni plating or electrolytic Ni plating, and an Sn coating is then formed by electro-tin plating may be formed.

In addition, a coating made of at least one of metal such as Pt, Au, Cu, Ti, Ni, and Sn or an alloy thereof may be formed on the terminal electrodes 57 and 67 by sputtering.

The surface of the all-solid-state batteries 50 and 60 of the present embodiment may be subjected to a water-repellent treatment. A water-repellent treatment method is not particularly limited, and for example, immersion in a solution containing a fluororesin, a silane resin or the like can be performed for formation.

A glass layer may be formed on the surface of the all-solid-state batteries 50 and 60 of the present embodiment. A formation method is not particularly limited, and glass with a low melting point can be applied and heated at a desired temperature for formation.

The all-solid-state batteries 50 and 60 of the present embodiment may be accommodated in a highly hermetic case. The shape of the case for accommodation is not particularly limited, and known shapes can be used. For example, a rectangular shape, a columnar shape, a coin shape, and a card shape can be used.

The all-solid-state batteries 50 and 60 of the present embodiment may be covered with a resin. The resin that can be used is a known resin, and in order to improve the heat resistance and moisture resistance of the coating, a fluorine resin, an imide resin, or an epoxy resin is preferably used.

The all-solid-state batteries 50 and 60 of the present embodiment may be used in combination with other lithium ion secondary batteries, solar power generation unit, wind power generation units, geothermal power generation units, piezoelectric elements, thermoelectric elements or the like.

While embodiments of the present invention have been described above in detail with reference to the drawings, configurations and combinations thereof in the embodiments are only examples, and additions, omissions, substitutions and other modifications of the configurations can be made without departing from the scope of the present invention. A plurality of embodiments in an appropriate combination may be performed as long as the effects thereof are obtained.

EXAMPLES

While the present invention will be described below in detail with reference to examples, the present invention is not limited to these examples. Here, all parts are parts by weight unless otherwise specified.

Example 1

(Production of Positive Electrode Active Material)

$Li_3V_2(PO_4)_3$ produced by the following method was used as a positive electrode active material. $Li_2CO_3$, $V_2O_5$, and $NH_4H_2PO_4$ were used as starting materials, and these were weighed at a molar ratio of 3:2:6 and wet-mixed using water as a solvent in a ball mill for 16 hours, and then dehydrated and dried. The obtained powder was calcined at 850° C. for 2 hours in a nitrogen-hydrogen mixed gas. The calcined product was roughly crushed and wet-crushed using ethanol as a solvent in a ball mill for 24 hours and then dried to obtain a positive electrode active material powder. The average particle size of the powder was 0.3 μm. It was confirmed that the produced powder was $Li_3V_2(PO_4)_3$ using an X-ray diffraction device.

(Production of Positive Electrode Active Material Paste)

Regarding a positive electrode active material paste, 15 parts of ethyl cellulose as a binder and 65 parts of dihydroterpineol as a solvent were added to 100 parts of the produced $Li_3V_2(PO_4)_3$ active material powder, and the mixture was kneaded and dispersed in a hybrid mixer to produce a positive electrode active material paste.

(Production of Negative Electrode Active Material)

$Li_4Ti_5O_{12}$ produced by the following method was used as a negative electrode active material. $Li_2CO_3$ and $TiO_2$ were used as starting materials and these were weighed out at a molar ratio of 2:5 and wet-mixed using water as a solvent in a ball mill for 16 hours and then dehydrated and dried. The obtained powder was calcined at 950° C. for 4 hours in the atmospheric gas. The calcined product was roughly crushed and wet-crushed using ethanol as a solvent in a ball mill for 16 hours and then dehydrated and dried to obtain a negative electrode active material powder. The average particle size of the powder was 0.4 μm. It was confirmed that the produced powder was $Li_4Ti_5O_{12}$ using an X-ray diffraction device.

(Production of Negative Electrode Active Material Paste)

Regarding a negative electrode active material paste, the produced $Li_4Ti_5O_{12}$ powder and copper powder were mixed at a volume ratio of 70/30, and 15 parts of ethyl cellulose as a binder and 65 parts of dihydroterpineol as a solvent were then added thereto and the mixture was kneaded and dispersed in a hybrid mixer to produce a negative electrode active material paste.

(Solid Electrolyte)

$LiTi_2(PO_4)_3$ produced by the following method was used as a solid electrolyte. $Li_2CO_3$, $TiO_2$ and $NH_4H_2PO_4$ were used as starting materials and these were weighed out at a molar ratio of 1:2:6 and wet-mixed using water as a solvent in a ball mill for 16 hours, and then dehydrated and dried. The obtained powder was calcined at 800° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.4 μm. It was confirmed that the produced powder was $LiTi_2(PO_4)_3$ using an X-ray diffraction device.

(Solid Electrolyte Layer Sheet)

Regarding a solid electrolyte layer sheet, 100 parts of ethanol as a solvent and 200 parts of toluene were added to 100 parts of the produced $LiTi_2(PO_4)_3$ powder in a ball mill and wet-mixed. Then, 16 parts of a polyvinyl butyral binder and 4.8 parts of benzyl butyl phthalate were additionally added and mixed to prepare a solid electrolyte slurry. The solid electrolyte slurry was sheet-molded by a doctor blade method using a PET film as a base material to obtain a solid electrolyte layer sheet having a thickness of (Exterior Unit Material)

The $LiZr_2(PO_4)_3$ monoclinic crystal powder produced by the following method was used as an exterior unit material. $Li_2CO_3$, $ZrO_2$ and $NH_4H_2PO_4$ were used as starting materials and these were weighed out at a molar ratio of 1:2:6 and wet-mixed using water as a solvent in a ball mill for 16 hours, and then dehydrated and dried. The obtained powder was calcined at 900° C. for 3 hours in air. The calcined product was roughly crushed and wet-crushed using ethanol as a solvent in a ball mill for 16 hours and then dehydrated and dried to obtain an exterior unit material powder. The average particle size of the powder was 0.5 μm. It was confirmed that the produced powder was the $LiZr_2(PO_4)_3$ monoclinic crystal using an X-ray diffraction device.

(Exterior Unit Sheet)

Regarding an exterior unit sheet, 100 parts of ethanol as a solvent and 200 parts of toluene were added to 100 parts of the produced $LiZr_2(PO_4)_3$ monoclinic crystal powder in a ball mill and wet-mixed. Then, 16 parts of a polyvinyl butyral binder and 4.8 parts of benzyl butyl phthalate were additionally added and mixed to prepare an exterior unit slurry. The exterior unit slurry was sheet-molded by a doctor blade method using a PET film as a base material to obtain an exterior unit sheet having a thickness of 15 μm.

(Exterior Unit Paste)

Regarding an exterior unit paste, 15 parts of ethyl cellulose as a binder and 65 parts of dihydroterpineol as a solvent were added to 100 parts of the produced $LiZr_2(PO_4)_3$ monoclinic crystal powder and the mixture was kneaded and dispersed in a hybrid mixer to produce a positive electrode active material paste.

(Production of Positive Electrode Current Collector Paste)

Regarding a positive electrode current collector paste, copper powder and $Li_3V_2(PO_4)_3$ powder were mixed at a volume ratio of 80/20, and 10 parts of ethyl cellulose as a binder and 50 parts of dihydroterpineol as a solvent were then added thereto and the mixture was kneaded and dispersed using three rollers to produce a positive electrode current collector paste.

(Production of Negative Electrode Current Collector Paste)

Regarding a negative electrode current collector paste, copper powder and $Li_4Ti_5O_{12}$ powder were mixed at a volume ratio of 80/20, and 10 parts of ethyl cellulose as a binder and 50 parts of dihydroterpineol as a solvent were then added thereto and the mixture was kneaded and dispersed using three rollers to produce a negative electrode current collector paste.

An all-solid-state battery was produced using these pastes as follows.

(Production of Positive Electrode Active Material Unit)

The positive electrode active material paste was printed in a thickness of 5 μm on the solid electrolyte layer sheet by screen printing. Next, the printed positive electrode active material paste was dried at 80 to 100° C. for 5 to 10 minutes and the positive electrode current collector paste was then printed in a thickness of 5 μm thereon by screen printing. Next, the printed positive electrode current collector paste was dried at 80 to 100° C. for 5 to 10 minutes and additionally, the positive electrode active material paste was printed in a thickness of 5 μm again thereon by screen printing. The printed positive electrode active material paste was dried at 80 to 100° C. for 5 to 10 minutes. Next, the screen was changed, the exterior unit paste was printed in a thickness of 15 μm on a part in which the positive electrode active material paste and the positive electrode current collector paste were not printed and dried at 80 to 100° C. for 5 to 10 minutes, and a PET film was then peeled off. Thereby, a positive electrode active material unit in which the positive electrode active material paste, the positive electrode current collector paste, the positive electrode active material paste, and the exterior unit paste were printed and dried on the solid electrolyte layer sheet was obtained.

(Production of Negative Electrode Active Material Unit)

The negative electrode active material paste was printed in a thickness of 10 μm on the solid electrolyte layer sheet by screen printing. Next, the printed negative electrode active material paste was dried at 80 to 100° C. for 5 to 10 minutes and the negative electrode current collector paste was then printed in a thickness of 5 μm thereon by screen printing. Next, the printed negative electrode current collector paste was dried at 80 to 100° C. for 5 to 10 minutes and additionally, the negative electrode active material paste was printed in a thickness of 10 μm again thereon by screen printing. The printed negative electrode active material paste was dried at 80 to 100° C. for 5 to 10 minutes. Next, the screen was changed, the exterior unit paste was printed in a thickness of 25 μm on a part in which the negative electrode active material paste and the negative electrode current collector paste were not printed and dried at 80 to 100° C. for 5 to 10 minutes, and a PET film was then peeled off. Thereby, a negative electrode active material unit in which the negative electrode active material paste, the negative electrode current collector paste, the negative electrode active material paste, and the exterior unit paste were printed and dried on the solid electrolyte layer sheet was obtained.
(Production of Laminate)

10 exterior unit sheets were stacked, and 13 positive electrode active material units and 13 negative electrode active material units were stacked and laminated with the paste printing surface facing downward in the order of the positive electrode active material units, the negative electrode active material units. In this case, the units were shifted and stacked so that the positive electrode current collector paste layer of the positive electrode active material unit extended only to one end surface and the negative electrode current collector paste layer of the negative electrode active material unit extended to the other surface. Then, 10 exterior unit sheets were stacked. Then, this was molded at a temperature of 80° C. and a pressure of 1,000 kgf/cm2 (98 MPa) and then cut to produce a laminated block. Then, the laminated block was subjected to simultaneous curing to obtain a sintered product. In the simultaneous curing, heating was performed to a curing temperature of 900° C. in nitrogen at a heating rate of 200° C./hour and the temperature was maintained for 0.5 hours, and natural cooling was performed after curing. The appearance size of the battery after simultaneous curing was 3.2 mm×2.5 mm×1.0 mm.
(Formation of Terminal Electrode)

Then, an InGa electrode paste was applied to the positive electrode current collector layer and the negative electrode current collector layer of the obtained sintered product and dried, and terminal electrodes were attached to the positive electrode current collector layer and the negative electrode current collector layer to produce an all-solid-state battery.
(Evaluation)

The chemical composition and crystal structure of the produced solid electrolyte and exterior unit material were measured by the following methods.
(Chemical Composition)

The solid electrolyte and the exterior unit material were measured through ICP-AES, and the compositions of the solid electrolyte and the exterior unit material were analyzed.
(Crystal Structure)

X-ray diffraction patterns of the solid electrolyte and the exterior unit material were measured by a powder X-ray diffraction method. The crystal structures of the solid electrolyte and the exterior unit material were identified using the obtained X-ray diffraction patterns.
(Lithium Ion Conductivity)

The ion conductivity of the solid electrolyte layer and the ion conductivity of the exterior unit were measured by the following method. 0.5 g of the solid electrolyte or the exterior unit material was weighed out and put into a mold with a diameter of 12 mm, and cold-pressed at a pressure of 1.0 t/cm$^2$, and then cured at 900° C. for 2 hours to obtain a solid electrolyte layer sintered product or an exterior unit sintered product. After masking was performed on the outer circumference of the obtained solid electrolyte layer sintered product or exterior unit sintered product in order to prevent short circuiting, gold sputtering was performed on both surfaces to form a gold electrode. Next, the masking was removed. The lithium ion conductivity was measured using an impedance measurement device (model number SI1260 commercially available from Solartron) under conditions of an amplitude of 50 mV and a frequency of 0.02 Hz to 1 MHz. The ion conductivity was determined from the measured value and the thickness and area of the solid electrolyte sintered product or the exterior unit sintered product. Table 1 shows the ion conductivity of the solid electrolyte layer, the ion conductivity of the exterior unit, and the ion conductivity ratio Y.

The ion conductivity ratio Y in this example was a value calculated by dividing the obtained ion conductivity of the exterior unit by the ion conductivity of the solid electrolyte layer.

Example 2

An all-solid-state battery was produced in the same manner as in Example 1 except that $LiGe_2(PO_4)_3$ produced by the following method was used as a solid electrolyte.

$Li_2CO_3$, $GeO_2$ and $NH_4H_2PO_4$ were used as starting materials, and these were weighed out at a molar ratio of 1:2:6 and wet-mixed using water as a solvent in a ball mill for 16 hours, and then dehydrated and dried. The obtained powder was calcined at 900° C. for 3 hours in air. The calcined product was roughly crushed and wet-crushed using ethanol as a solvent in a ball mill for 16 hours and then dehydrated and dried to obtain a solid electrolyte powder. The average particle size of the powder was 0.5 μm. It was confirmed that the produced powder was $LiGe_2(PO_4)_3$ using an X-ray diffraction device. Table 1 shows the ion conductivities of the solid electrolyte layer and the exterior unit and the ion conductivity ratio Y.

Example 3

An all-solid-state battery was produced in the same manner as in Example 1 except that the $LiZr_2(PO_4)_3$ rhombohedral crystal produced by the following method was used as a solid electrolyte.

Single crystal particles of a $LiZr_2(PO_4)_3$ rhombohedral crystal were produced by the following procedures. First, $LiOH \cdot H_2O$, $ZrO(NO_3)_2$, and $NH_4(H_2PO_4)$ were weighed out at a stoichiometric ratio and dissolved in water. Respective solutions were mixed, the pH was adjusted and the mixture was then heated to 80° C., and then gradually cooled. The crystal phase of the single crystal confirmed using X-ray diffraction was a rhombohedral crystal, and the particle size (D50) was 0.6 μm. Table 1 shows the ion conductivities of the solid electrolyte layer and the exterior unit and the ion conductivity ratio Y.

Example 4

An all-solid-state battery was produced in the same manner as in Example 1 except that the $Li_{1.5}Ca_{0.5}Zr_{1.5}(PO_4)_3$ rhombohedral crystal produced by the following method was used as a solid electrolyte.

$Li_2CO_3$, $CaCO_3$, $ZrO_2$ and $NH_4H_2PO_4$ were used as starting materials and these were weighed out at a molar ratio of 1.5:1:3:6 and wet-mixed using water as a solvent in a ball mill for 16 hours, and then dehydrated and dried. The obtained powder was calcined at 1,200° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.5 μm. It was confirmed that the produced powder was the $Li_{1.5}Ca_{0.5}Zr_{1.5}(PO_4)_3$ rhombohedral crystal using an X-ray diffraction device. Table 1 shows the ion conductivities of the solid electrolyte layer and the exterior unit and the ion conductivity ratio Y.

Example 5

An all-solid-state battery was produced in the same manner as in Example 1 except that $Li_{1.3}Al_{0.3}Ti_{1.7}(PO_4)_3$ produced by the following method was used as a solid electrolyte.

$Li_2CO_3$, $Al_2O_3$, $TiO_2$ and $NH_4H_2PO_4$ were used as starting materials and these were weighed out at a molar ratio of 0.85:0.15:1.7:3 and wet-mixed using water as a solvent in a ball mill for 16 hours, and then dehydrated and dried. The obtained powder was calcined at 800° C. 2 hours in air. The calcined product was roughly crushed and wet-crushed using ethanol as a solvent in a ball mill for 16 hours and then dehydrated and dried to obtain a solid electrolyte powder. The average particle size of the powder was 0.5 μm. It was confirmed that the produced powder was $Li_{1.3}Al_{0.3}Ti_{1.7}(PO_4)_3$ using an X-ray diffraction device. Table 1 shows the ion conductivities of the solid electrolyte layer and the exterior unit and the ion conductivity ratio Y.

Example 6

An all-solid-state battery was produced in the same manner as in Example 1 except that $Li_{1.3}Al_{0.3}Ge_{1.7}(PO_4)_3$ produced by the following method was used as a solid electrolyte.

$Li_2CO_3$, $Al_2O_3$, $GeO_2$ and $NH_4H_2PO_4$ were used as starting materials and these were weighed out at a molar ratio of 0.85:0.15:1.7:3 and wet-mixed using water as a solvent in a ball mill for 16 hours, and then dehydrated and dried. The obtained powder was calcined at 900° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.5 μm. It was confirmed that the produced powder was $Li_{1.3}Al_{0.3}Ge_{1.7}(PO_4)_3$ using an X-ray diffraction device. Table 1 shows the ion conductivities of the solid electrolyte layer and the exterior unit and the ion conductivity ratio Y.

Example 7

An all-solid-state battery was produced in the same manner as in Example 1 except that $Li_{3.5}Si_{0.5}P_{0.5}O_4$ produced by the following method was used as a solid electrolyte.

$Li_2CO_3$, $SiO_2$ and $Li_3PO_4$ were used as starting materials and these were weighed out at a molar ratio of 2:1:1 and wet-mixed using water as a solvent in a ball mill for 16 hours, and then dehydrated and dried. The obtained powder was calcined at 950° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.6 μm. It was confirmed that the produced powder was $Li_{3.5}Si_{0.5}P_{0.5}O_4$ using an X-ray diffraction device. Table 1 shows the ion conductivities of the solid electrolyte layer and the exterior unit and the ion conductivity ratio Y.

Example 8

An all-solid-state battery was produced in the same manner as in Example 1 except that $Li_7La_3Zr_2O_{12}$ produced by the following method was used as a solid electrolyte.

$Li_2CO_3$, $La_2O_3$, and $ZrO_2$ were used as starting materials and these were weighed out at a molar ratio of 7:3:4 and wet-mixed using water as a solvent in a ball mill for 16 hours, and then dehydrated and dried. The obtained powder was calcined at 950° C. for 5 hours in air. The calcined product was roughly crushed and wet-crushed using ethanol as a solvent in a ball mill for 16 hours and then dehydrated and dried to obtain a solid electrolyte powder. The average particle size of the powder was 0.5 It was confirmed that the produced powder was $Li_7La_3Zr_2O_{12}$ using an X-ray diffraction device. Table 1 shows the ion conductivities of the solid electrolyte layer and the exterior unit and the ion conductivity ratio Y.

Examples 9 to 10

An all-solid-state battery was produced in the same manner as in Example 3 and Example 5 except that the $LiZr_2(PO_4)_3$ rhombohedral crystal produced by the following method was used as an exterior unit material.

Single crystal particles of a $LiZr_2(PO_4)_3$ rhombohedral crystal were produced by the following procedures. First, $LiOH \cdot H_2O$, $ZrO(NO_3)_2$, and $NH_4(H_2PO_4)$ were weighed out at a stoichiometric ratio and dissolved in water. Respective solutions were mixed, the pH was adjusted and the mixture was then heated to 80° C., and then gradually cooled. The crystal phase of the single crystal confirmed using X-ray diffraction was a rhombohedral crystal, and the particle size (D50) was 0.6 Table 1 shows the ion conductivities of the solid electrolyte layer and the exterior unit and the ion conductivity ratio Y.

Example 11

An all-solid-state battery was produced in the same manner as in Example 5 except that $Li_{1.3}Al_{0.3}Ti_{1.7}(PO_4)_3$ produced by the following method was used as an exterior unit material.

$Li_2CO_3$, $Al_2O_3$, $TiO_2$ and $NH_4H_2PO_4$ were used as starting materials and these were weighed out at a molar ratio of 0.85:0.15:1.7:3 and wet-mixed using water as a solvent in a ball mill for 16 hours, and then dehydrated and dried. The obtained powder was calcined at 800° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.5 μm. It was confirmed that the produced powder was $Li_{1.3}Al_{0.3}Ti_{1.7}(PO_4)_3$ using an X-ray diffraction device. Table 1 shows the ion conductivities of the solid electrolyte layer and the exterior unit and the ion conductivity ratio Y.

Example 12

An all-solid-state battery was produced in the same manner as in Example 6 except that the $LiZr_2(PO_4)_3$ rhombohedral crystal produced by the following method was used as an exterior unit material.

Single crystal particles of a $LiZr_2(PO_4)_3$ rhombohedral crystal were produced by the following procedures. First, $LiOH \cdot H_2O$, $ZrO(NO_3)_2$, and $NH_4(H_2PO_4)$ were weighed out at a stoichiometric ratio and dissolved in water. Respective solutions were mixed, the pH was adjusted and the mixture was then heated to 80° C., and then gradually cooled. The crystal phase of the single crystal confirmed using X-ray diffraction was a rhombohedral crystal, and the particle size (D50) was 0.6 μm. Table 1 shows the ion conductivities of the solid electrolyte layer and the exterior unit and the ion conductivity ratio Y.

Example 13

An all-solid-state battery was produced in the same manner as in Example 6 except that $Li_{1.3}Al_{0.3}Ge_{1.7}(PO_4)_3$ produced by the following method was used as an exterior unit material.

$Li_2CO_3$, $Al_2O_3$, $GeO_2$ and $NH_4H_2PO_4$ were used as starting materials and these were weighed out at a molar ratio of 0.85:0.15:1.7:3 and wet-mixed using water as a solvent in a ball mill for 16 hours, and then dehydrated and dried. The obtained powder was calcined at 900° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.5 µm. It was confirmed that the produced powder was $Li_{1.3}Al_{0.3}Ge_{1.7}(PO_4)_3$ using an X-ray diffraction device. Table 1 shows the ion conductivities of the solid electrolyte layer and the exterior unit and the ion conductivity ratio Y.

Example 14

An all-solid-state battery was produced in the same manner as in Example 7 except that the $LiZr_2(PO_4)_3$ rhombohedral crystal produced by the following method was used as an exterior unit material.

Single crystal particles of a $LiZr_2(PO_4)_3$ rhombohedral crystal were produced by the following procedures. First, $LiOH·H_2O$, $ZrO(NO_3)_2$, and $NH_4(H_2PO_4)$ were weighed out at a stoichiometric ratio and dissolved in water. Respective solutions were mixed, the pH was adjusted and the mixture was then heated to 80° C., and then gradually cooled. The crystal phase of the single crystal confirmed using X-ray diffraction was a rhombohedral crystal, and the particle size (D50) was 0.6 Table 1 shows the ion conductivities of the solid electrolyte layer and the exterior unit and the ion conductivity ratio Y.

Example 15

An all-solid-state battery was produced in the same manner as in Example 7 except that $Li_{3.5}Si_{0.5}P_{0.5}O_4$ produced by the following method was used as an exterior unit material.

$Li_2CO_3$, $SiO_2$ and $Li_3PO_4$ were used as starting materials and these were weighed out at a molar ratio of 2:1:1 and wet-mixed using water as a solvent in a ball mill for 16 hours, and then dehydrated and dried. The obtained powder was calcined at 950° C. for 2 hours in air. The calcined product was roughly crushed and wet-crushed using ethanol as a solvent in a ball mill for 16 hours and then dehydrated and dried to obtain a solid electrolyte powder. The average particle size of the powder was 0.6 It was confirmed that the produced powder was $Li_{3.5}Si_{0.5}P_{0.5}O_4$ using an X-ray diffraction device. Table 1 shows the ion conductivities of the solid electrolyte layer and the exterior unit and the ion conductivity ratio Y.

Example 16

An all-solid-state battery was produced in the same manner as in Example 4 except that the $LiZr_2(PO_4)_3$ rhombohedral crystal produced by the following method was used as an exterior unit material.

Single crystal particles of a $LiZr_2(PO_4)_3$ rhombohedral crystal were produced by the following procedures. First, $LiOH·H_2O$, $ZrO(NO_3)_2$, and $NH_4(H_2PO_4)$ were weighed out at a stoichiometric ratio and dissolved in water. Respective solutions were mixed, the pH was adjusted and the mixture was then heated to 80° C., and then gradually cooled. The crystal phase of the single crystal confirmed using X-ray diffraction was a rhombohedral crystal, and the particle size (D50) was 0.6 µm. Table 1 shows the ion conductivities of the solid electrolyte layer and the exterior unit and the ion conductivity ratio Y.

Example 17

An all-solid-state battery was produced in the same manner as in Example 1 except that the ion conductivity was evaluated and self-discharge characteristics were evaluated in a constant temperature bath at 60° C. Table 1 shows the ion conductivities of the solid electrolyte layer and the exterior unit and the ion conductivity ratio Y.

Example 18

An all-solid-state battery was produced in the same manner as in Example 3 except that $ZrO_2$ was used as an exterior unit material. Table 1 shows the ion conductivities of the solid electrolyte layer and the exterior unit and the ion conductivity ratio Y.

Example 19

An all-solid-state battery was produced in the same manner as in Example 3 except that $Ai_2O_3$ was used as an exterior unit material. Table 1 shows the ion conductivities of the solid electrolyte layer and the exterior unit and the ion conductivity ratio Y.

Example 20

An all-solid-state battery was produced in the same manner as in Example 1 except that a $LiZr_2(PO_4)_3$ monoclinic crystal was used as a solid electrolyte and a $LiZr_2(PO_4)_3$ rhombohedral crystal was used as an exterior unit material. Table 1 shows the ion conductivities of the solid electrolyte layer and the exterior unit and the ion conductivity ratio Y.

Example 21

An all-solid-state battery was produced in the same manner as in Example 1 except that $LiTi_2(PO_4)_3$ was used as a solid electrolyte and $Li_{1.3}Al_{0.3}Ti_{1.7}(PO_4)_3$ was used as an exterior unit material. Table 1 shows the ion conductivities of the solid electrolyte layer and the exterior unit and the ion conductivity ratio Y.

Example 22

An all-solid-state battery was produced in the same manner as in Example 1 except that $LiGe_2(PO_4)_3$ was used as a solid electrolyte and $Li_{1.3}Al_{0.3}Ge_{1.7}(PO_4)_3$ was used as an exterior unit material. Table 1 shows the ion conductivities of the solid electrolyte layer and the exterior unit and the ion conductivity ratio Y.

Example 23

An all-solid-state battery was produced in the same manner as in Example 1 except that $LiGe_2(PO_4)_3$ was used as a solid electrolyte and a $LiZr_2(PO_4)_3$ rhombohedral crystal was used as an exterior unit material. Table 1 shows the ion conductivities of the solid electrolyte layer and the exterior unit and the ion conductivity ratio Y.

Example 24

An all-solid-state battery was produced in the same manner as in Example 1 except that a $LiZr_2(PO_4)_3$ monoclinic crystal was used as a solid electrolyte and $Li_{1.3}Al_{0.3}Ti_{1.7}(PO_4)_3$ was used as an exterior unit material, and the ion conductivity was evaluated and self-discharge characteristics were evaluated in a constant temperature bath at 60° C. Table 1 shows the ion conductivities of the solid electrolyte layer and the exterior unit and the ion conductivity ratio Y.

(Evaluation of Self-Discharge Characteristics)

The terminal electrodes of the all-solid-state batteries produced in Examples 1 to 24 were attached to a jig of a type fixed with a spring-loaded pin.

First, the all-solid-state battery was charged to a cutoff voltage of 2.8 V with a constant current of 1 μA. Then, the fully charged all-solid-state battery was removed and stored in a constant temperature bath at 25° C. for one month. After one month, attachment to a jig was performed, discharging was performed to a cutoff voltage of 1.8 V with a constant current of 1 μA, and a self-discharge rate was determined. Here, evaluation was performed in a constant temperature bath at 25° C. unless the evaluation temperature was designated in the examples. In addition, when the temperature was designated in the examples, evaluation was performed in a constant temperature bath at the designated temperature. Here, the self-discharge rate was calculated as {1-(discharge capacity after storage for one month/full charge capacity)}×100.

TABLE 1

| | Exterior unit Material | Ion conductivity [S/cm] | Solid electrolyte layer Material | Ion conductivity [S/cm] | Ion conductivity ratio Y | Self-discharge rate % |
|---|---|---|---|---|---|---|
| Example 1 | $LiZr_2(PO_4)_3$ monoclinic crystal | $5.0 \times 10^{-9}$ | $LiTi_2(PO_4)_3$ | $7.0 \times 10^{-8}$ | $7.14 \times 10^{-2}$ | 2.9 |
| Example 2 | $LiZr_2(PO_4)_3$ monoclinic crystal | $5.0 \times 10^{-9}$ | $LiGe_2(PO_4)_3$ | $6.3 \times 10^{-8}$ | $7.94 \times 10^{-2}$ | 3.1 |
| Example 3 | $LiZr_2(PO_4)_3$ monoclinic crystal | $5.0 \times 10^{-9}$ | $LiZr_2(PO_4)_3$ rhombohedral | $6.0 \times 10^{-6}$ | $8.33 \times 10^{-4}$ | 2.4 |
| Example 4 | $LiZr_2(PO_4)_3$ monoclinic crystal | $5.0 \times 10^{-9}$ | $Li_{1.5}Ca_{0.5}Zr_{1.5}(PO_4)_3$ rhombohedral | $4.3 \times 10^{-5}$ | $1.16 \times 10^{-4}$ | 2.5 |
| Example 5 | $LiZr_2(PO_4)_3$ monoclinic crystal | $5.0 \times 10^{-9}$ | $Li_{1.3}Al_{0.3}Ti_{1.7}(PO_4)_3$ | $5.1 \times 10^{-4}$ | $9.80 \times 10^{-6}$ | 6 |
| Example 6 | $LiZr_2(PO_4)_3$ monoclinic crystal | $5.0 \times 10^{-9}$ | $Li_{1.3}Al_{0.3}Ge_{1.7}(PO_4)_3$ | $4.1 \times 10^{-4}$ | $1.22 \times 10^{-5}$ | 5.7 |
| Example 7 | $LiZr_2(PO_4)_3$ monoclinic crystal | $5.0 \times 10^{-9}$ | $Li_{3.5}Si_{0.5}P_{0.5}O_4$ | $3.3 \times 10^{-5}$ | $1.52 \times 10^{-4}$ | 4.1 |
| Example 8 | $LiZr_2(PO_4)_3$ monoclinic crystal | $5.0 \times 10^{-9}$ | $Li_7La_3Zr_2O_{12}$ | $5.3 \times 10^{-4}$ | $9.43 \times 10^{-6}$ | 6 |
| Example 9 | $LiZr_2(PO_4)_3$ rhombohedral | $6.0 \times 10^{-6}$ | $LiZr_2(PO_4)_3$ rhombohedral | $6.0 \times 10^{-6}$ | 1.0 | 2.6 |
| Example 10 | $LiZr_2(PO_4)_3$ rhombohedral | $6.0 \times 10^{-6}$ | $Li_{1.3}Al_{0.3}Ti_{1.7}(PO_4)_3$ | $5.1 \times 10^{-4}$ | $1.18 \times 10^{-2}$ | 2 |
| Example 11 | $Li_{1.3}Al_{0.3}Ti_{1.7}(PO_4)_3$ | $5.1 \times 10^{-4}$ | $Li_{1.3}Al_{0.3}Ti_{1.7}(PO_4)_3$ | $5.1 \times 10^{-4}$ | 1.0 | 2.8 |
| Example 12 | $LiZr_2(PO_4)_3$ rhombohedral | $6.0 \times 10^{-6}$ | $Li_{1.3}Al_{0.3}Ge_{1.7}(PO_4)_3$ | $4.1 \times 10^{-4}$ | $1.46 \times 10^{-2}$ | 3.3 |
| Example 13 | $Li_{1.3}Al_{0.3}Ge_{1.7}(PO_4)_3$ | $4.1 \times 10^{-4}$ | $Li_{1.3}Al_{0.3}Ge_{1.7}(PO_4)_3$ | $4.1 \times 10^{-4}$ | 1.0 | 3.1 |
| Example 14 | $LiZr_2(PO_4)_3$ rhombohedral | $6.0 \times 10^{-6}$ | $Li_{3.5}Si_{0.5}P_{0.5}O_4$ | $3.3 \times 10^{-5}$ | $1.82 \times 10^{-1}$ | 2.6 |
| Example 15 | $Li_{3.5}Si_{0.5}P_{0.5}O_4$ | $3.3 \times 10^{-5}$ | $Li_{3.5}Si_{0.5}P_{0.5}O_4$ | $3.3 \times 10^{-5}$ | 1.0 | 2.7 |
| Example 16 | $LiZr_2(PO_4)_3$ rhombohedral | $6.0 \times 10^{-6}$ | $Li_{1.5}Ca_{0.5}Zr_{1.5}(PO_4)_3$ rhombohedral | $4.3 \times 10^{-5}$ | $1.40 \times 10^{-1}$ | 2.7 |
| Example 17 | $LiZr_2(PO_4)_3$ monoclinic crystal | $3.7 \times 10^{-7}$ | $Li_{1.3}Al_{0.3}Ti_{1.7}(PO_4)_3$ | $3.2 \times 10^{-3}$ | $1.16 \times 10^{-4}$ | 5.5 |
| Example 18 | $ZrO_2$ | 0 | $LiZr_2(PO_4)_3$ rhombohedral | $6.0 \times 10^{-6}$ | 0 | 5.8 |
| Example 19 | $Al_2O_3$ | 0 | $LiZr_2(PO_4)_3$ rhombohedral | $6.0 \times 10^{-6}$ | 0 | 6 |
| Example 20 | $LiZr_2(PO_4)_3$ rhombohedral | $6.0 \times 10^{-6}$ | $LiZr_2(PO_4)_3$ monoclinic crystal | $5.0 \times 10^{-9}$ | $1.20 \times 10^3$ | 12 |
| Example 21 | $Li_{1.3}Al_{0.3}Ti_{1.7}(PO_4)_3$ | $5.1 \times 10^{-4}$ | $LiTi_2(PO_4)_3$ | $7.0 \times 10^{-8}$ | $7.29 \times 10^3$ | 16 |
| Example 22 | $Li_{1.3}Al_{0.3}Ge_{1.7}(PO_4)_3$ | $4.1 \times 10^{-4}$ | $LiGe_2(PO_4)_3$ | $6.3 \times 10^{-8}$ | $6.51 \times 10$ | 14 |
| Example 23 | $LiZr_2(PO_4)_3$ rhombohedral | $6.0 \times 10^{-6}$ | $LiGe_2(PO_4)_3$ | $6.3 \times 10^{-8}$ | $9.52 \times 10$ | 11 |
| Example 24 | $Li_{1.3}Al_{0.3}Ti_{1.7}(PO_4)_3$ | $3.2 \times 10^{-3}$ | $LiZr_2(PO_4)_3$ monoclinic crystal | $3.7 \times 10^{-7}$ | $8.65 \times 10^3$ | 18 |

The all-solid-state batteries produced in Examples 1 to 24 resulted in a low self-discharge rate. It was possible to obtain the all-solid-state battery having improved self-discharge characteristics. In particular, in the all-solid-state batteries of Examples 1 to 19, when the value of Y was set to be within a range of $10^{-6} \leq Y \leq 1$, it was possible to reduce the self-discharge rate compared to Examples 20 to 24.

Example 25

In Example 25, an all-solid-state battery was produced in the same manner as in Example 1 except that an exterior unit sheet and an exterior unit paste to which sucrose was added at a volume ratio of 0.5 vol % were prepared and laminated and cut to form a laminated block, and then washed with deionized water for 5 minutes. Table 2 shows the porosity P of the exterior unit and the self-discharge rate.

Example 26

In Example 26, an all-solid-state battery was produced in the same manner as in Example 2 except that an exterior unit sheet and an exterior unit paste to which sucrose was added at a volume ratio of 1.2 vol % were prepared and laminated and cut to form a laminated block, and then washed with deionized water for 5 minutes. Table 2 shows the porosity P of the exterior unit and the self-discharge rate.

Example 27

In Example 27, an all-solid-state battery was produced in the same manner as in Example 3 except that an exterior unit sheet and an exterior unit paste to which sucrose was added at a volume ratio of 0.3 vol % were prepared and laminated and cut to form a laminated block, and then washed with deionized water for 5 minutes. Table 2 shows the porosity P of the exterior unit and the self-discharge rate.

Example 28

In Example 28, an all-solid-state battery was produced in the same manner as in Example 4 except that an exterior unit sheet and an exterior unit paste to which sucrose was added at a volume ratio of 0.4 vol % were prepared and laminated and cut to form a laminated block, and then washed with deionized water for 5 minutes. Table 2 shows the porosity P of the exterior unit and the self-discharge rate.

Example 29

In Example 29, an all-solid-state battery was produced in the same manner as in Example 5 except that an exterior unit sheet and an exterior unit paste to which sucrose was added at a volume ratio of 2.3 vol % were prepared and laminated and cut to form a laminated block, and then washed with deionized water for 5 minutes. Table 2 shows the porosity P of the exterior unit and the self-discharge rate.

Example 30

In Example 30, an all-solid-state battery was produced in the same manner as in Example 6 except that an exterior unit sheet and an exterior unit paste to which sucrose was added at a volume ratio of 2.1 vol % were prepared and laminated and cut to form a laminated block, and then washed with deionized water for 5 minutes. Table 2 shows the porosity P of the exterior unit and the self-discharge rate.

Example 31

In Example 31, an all-solid-state battery was produced in the same manner as in Example 7 except that an exterior unit sheet and an exterior unit paste to which sucrose was added at a volume ratio of 2 vol % were prepared and laminated and cut to form a laminated block, and then washed with deionized water for 5 minutes. Table 2 shows the porosity P of the exterior unit and the self-discharge rate.

Example 32

In Example 32, an all-solid-state battery was produced in the same manner as in Example 8 except that an exterior unit sheet and an exterior unit paste to which sucrose was added at a volume ratio of 3 vol % were prepared and laminated and cut to form a laminated block, and then washed with deionized water for 5 minutes. Table 2 shows the porosity P of the exterior unit and the self-discharge rate.

Example 33

In Example 33, an all-solid-state battery was produced in the same manner as in Example 9 except that an exterior unit sheet and an exterior unit paste to which sucrose was added at a volume ratio of 0.8 vol % were prepared and laminated and cut to form a laminated block, and then washed with deionized water for 5 minutes. Table 2 shows the porosity P of the exterior unit and the self-discharge rate.

Example 34

In Example 34, an all-solid-state battery was produced in the same manner as in Example 10 except that an exterior unit sheet and an exterior unit paste to which sucrose was added at a volume ratio of 0.3 vol % were prepared and laminated and cut to form a laminated block, and then washed with deionized water for 5 minutes. Table 2 shows the porosity P of the exterior unit and the self-discharge rate.

Example 35

In Example 35, an all-solid-state battery was produced in the same manner as in Example 12 except that an exterior unit sheet and an exterior unit paste to which sucrose was added at a volume ratio of 2.5 vol % were prepared and laminated and cut to form a laminated block, and then washed with deionized water for 5 minutes. Table 2 shows the porosity P of the exterior unit and the self-discharge rate.

Example 36

In Example 36, an all-solid-state battery was produced in the same manner as in Example 14 except that an exterior unit sheet and an exterior unit paste to which sucrose was added at a volume ratio of 1.2 vol % were prepared and laminated and cut to form a laminated block, and then washed with deionized water for 5 minutes. Table 2 shows the porosity P of the exterior unit and the self-discharge rate.

Example 37

In Example 37, an all-solid-state battery was produced in the same manner as in Example 16 except that an exterior unit sheet and an exterior unit paste to which sucrose was added at a volume ratio of 1.5 vol % were prepared and laminated and cut to form a laminated block, and then washed with deionized water for 5 minutes. Table 2 shows the porosity P of the exterior unit and the self-discharge rate.

Example 38

In Example 38, an all-solid-state battery was produced in the same manner as in Example 3 except that $Li_{1.3}Al_{0.3}Ti_{1.7}(PO_4)_3$ was used as an exterior unit material and an exterior unit sheet and an exterior unit paste to which sucrose was added at a volume ratio of 0.3 vol % were prepared and laminated and cut to form a laminated block, and then washed with deionized water for 5 minutes. Table 2 shows the porosity P of the exterior unit and the self-discharge rate.

Example 39

In Example 39, an all-solid-state battery was produced in the same manner as in Example 11 except that an exterior unit sheet and an exterior unit paste to which sucrose was added at a volume ratio of 0.4 vol % were prepared and laminated and cut to form a laminated block, and then washed with deionized water for 5 minutes. Table 2 shows the porosity P of the exterior unit and the self-discharge rate.

Example 40

In Example 40, an all-solid-state battery was produced in the same manner as in Example 6 except that $Li_{1.3}Al_{0.3}Ti_{1.7}(PO_4)_3$ was used as an exterior unit material and an exterior unit sheet and an exterior unit paste to which sucrose was added at a volume ratio of 1 vol % were prepared and laminated and cut to form a laminated block, and then washed with deionized water for 5 minutes. Table 2 shows the porosity P of the exterior unit and the self-discharge rate.

Example 41

In Example 41, an all-solid-state battery was produced in the same manner as in Example 7 except that $Li_{1.3}Al_{0.3}Ti_{1.7}(PO_4)_3$ was used as an exterior unit material and an exterior unit sheet and an exterior unit paste to which sucrose was added at a volume ratio of 1.4 vol % were prepared and laminated and cut to form a laminated block, and then washed with deionized water for 5 minutes. Table 2 shows the porosity P of the exterior unit and the self-discharge rate.

Example 42

In Example 42, an all-solid-state battery was produced in the same manner as in Example 4 except that $Li_{1.3}Al_{0.3}Ti_{1.7}(PO_4)_3$ was used as an exterior unit material and an exterior unit sheet and an exterior unit paste to which sucrose was added at a volume ratio of 2.4 vol % were prepared and laminated and cut to form a laminated block, and then washed with deionized water for 5 minutes. Table 2 shows the porosity P of the exterior unit and the self-discharge rate.

Example 43

In Example 43, an all-solid-state battery was produced in the same manner as in Example 18 except that an exterior unit sheet and an exterior unit paste to which sucrose was added at a volume ratio of 1.8 vol % were prepared and laminated and cut to form a laminated block, and then washed with deionized water for 5 minutes. Table 2 shows the porosity P of the exterior unit and the self-discharge rate.

Example 44

In Example 44, an all-solid-state battery was produced in the same manner as in Example 19 except that an exterior unit sheet and an exterior unit paste to which sucrose was added at a volume ratio of 2 vol % were prepared and laminated and cut to form a laminated block, and then washed with deionized water for 5 minutes. Table 2 shows the porosity P of the exterior unit and the self-discharge rate.

Example 45

In Example 45, an all-solid-state battery was produced in the same manner as in Example 13 except that an exterior unit sheet and an exterior unit paste to which sucrose was added at a volume ratio of 0.3 vol % were prepared and laminated and cut to form a laminated block, and then washed with deionized water for 5 minutes. Table 2 shows the porosity P of the exterior unit and the self-discharge rate.

Example 46

In Example 46, an all-solid-state battery was produced in the same manner as in Example 15 except that an exterior unit sheet and an exterior unit paste to which sucrose was added at a volume ratio of 1 vol % were prepared and laminated and cut to form a laminated block, and then washed with deionized water for 5 minutes. Table 2 shows the porosity P of the exterior unit and the self-discharge rate.

Example 47

In Example 47, an all-solid-state battery was produced in the same manner as in Example 20 except that an exterior unit sheet and an exterior unit paste to which sucrose was added at a volume ratio of 3.3 vol % were prepared and laminated and cut to form a laminated block, and then washed with deionized water for 5 minutes. Table 2 shows the porosity P of the exterior unit and the self-discharge rate.

Example 48

In Example 48, an all-solid-state battery was produced in the same manner as in Example 21 except that an exterior unit sheet and an exterior unit paste to which sucrose was added at a volume ratio of 4 vol % were prepared and laminated and cut to form a laminated block, and then washed with deionized water for 5 minutes. Table 2 shows the porosity P of the exterior unit and the self-discharge rate.

Example 49

In Example 49, an all-solid-state battery was produced in the same manner as in Example 22 except that an exterior unit sheet and an exterior unit paste to which sucrose was added at a volume ratio of 3.2 vol % were prepared and laminated and cut to form a laminated block, and then washed with deionized water for 5 minutes. Table 2 shows the porosity P of the exterior unit and the self-discharge rate.

In the all-solid-state batteries produced in Examples 25 to 49, when the porosity P was controlled, it is possible to obtain the all-solid-state battery having improved self-discharge characteristics. In particular, in the all-solid-state batteries of Examples 25 to 46, when the porosity P was set to 0.4 or less, it was possible to reduce the self-discharge rate compared to the all-solid-state batteries of Examples 47 to 49.

TABLE 2

| | Exterior unit Material | Solid electrolyte layer Material | Porosity of exterior unit P | Self-discharge rate % |
|---|---|---|---|---|
| Example 25 | $LiZr_2(PO_4)_3$ monoclinic crystal | $LiTi_2(PO_4)_3$ | 0.15 | 2.8 |
| Example 26 | $LiZr_2(PO_4)_3$ monoclinic crystal | $LiGe_2(PO_4)_3$ | 0.24 | 3.3 |
| Example 27 | $LiZr_2(PO_4)_3$ monoclinic crystal | $LiZr_2(PO_4)_3$ rhombohedral | 0.12 | 2.3 |
| Example 28 | $LiZr_2(PO_4)_3$ monoclinic crystal | $Li_{1.5}Ca_{0.5}Zr_{1.5}(PO_4)_3$ rhombohedral | 0.13 | 2.3 |
| Example 29 | $LiZr_2(PO_4)_3$ monoclinic crystal | $Li_{1.3}Al_{0.3}Ti_{1.7}(PO_4)_3$ | 0.37 | 6.3 |
| Example 30 | $LiZr_2(PO_4)_3$ monoclinic crystal | $Li_{1.3}Al_{0.3}Ge_{1.7}(PO_4)_3$ | 0.33 | 5.9 |
| Example 31 | $LiZr_2(PO_4)_3$ monoclinic crystal | $Li_{3.5}Si_{0.5}P_{0.5}O_4$ | 0.31 | 4.3 |
| Example 32 | $LiZr_2(PO_4)_3$ monoclinic crystal | $Li_7La_3Zr_2O_{12}$ | 0.4 | 6.5 |
| Example 33 | $LiZr_2(PO_4)_3$ rhombohedral | $LiZr_2(PO_4)_3$ rhombohedral | 0.13 | 2.4 |
| Example 34 | $LiZr_2(PO_4)_3$ rhombohedral | $Li_{1.3}Al_{0.3}Ti_{1.7}(PO_4)_3$ | 0.08 | 1.7 |
| Example 35 | $LiZr_2(PO_4)_3$ rhombohedral | $Li_{1.3}Al_{0.3}Ge_{1.7}(PO_4)_3$ | 0.32 | 5.5 |
| Example 36 | $LiZr_2(PO_4)_3$ rhombohedral | $Li_{3.5}Si_{0.5}P_{0.5}O_4$ | 0.18 | 2.7 |
| Example 37 | $LiZr_2(PO_4)_3$ rhombohedral | $Li_{1.5}Ca_{0.5}Zr_{1.5}(PO_4)_3$ rhombohedral | 0.21 | 2.9 |
| Example 38 | $Li_{1.3}Al_{0.3}Ti_{1.7}(PO_4)_3$ | $LiZr_2(PO_4)_3$ rhombohedral | 0.12 | 2.4 |
| Example 39 | $Li_{1.3}Al_{0.3}Ti_{1.7}(PO_4)_3$ | $Li_{1.3}Al_{0.3}Ti_{1.7}(PO_4)_3$ | 0.14 | 2.7 |
| Example 40 | $Li_{1.3}Al_{0.3}Ti_{1.7}(PO_4)_3$ | $Li_{1.3}Al_{0.3}Ge_{1.7}(PO_4)_3$ | 0.2 | 2.8 |
| Example 41 | $Li_{1.3}Al_{0.3}Ti_{1.7}(PO_4)_3$ | $Li_{3.5}Si_{0.5}P_{0.5}O_4$ | 0.25 | 3 |
| Example 42 | $Li_{1.3}Al_{0.3}Ti_{1.7}(PO_4)_3$ | $Li_{1.5}Ca_{0.5}Zr_{1.5}(PO_4)_3$ rhombohedral | 0.36 | 6.2 |
| Example 43 | $ZrO_2$ | $LiZr_2(PO_4)_3$ rhombohedral | 0.37 | 6.5 |
| Example 44 | $Al_2O_3$ | $LiZr_2(PO_4)_3$ rhombohedral | 0.39 | 6.8 |
| Example 45 | $Li_{1.3}Al_{0.3}Ge_{1.7}(PO_4)_3$ | $Li_{1.3}Al_{0.3}Ge_{1.7}(PO_4)_3$ | 0.15 | 2.9 |
| Example 46 | $Li_{3.5}Si_{0.5}P_{0.5}O_4$ | $Li_{3.5}Si_{0.5}P_{0.5}O_4$ | 0.21 | 2.9 |
| Example 47 | $LiZr_2(PO_4)_3$ rhombohedral | $LiZr_2(PO_4)_3$ monoclinic crystal | 0.42 | 20 |
| Example 48 | $Li_{1.3}Al_{0.3}Ti_{1.7}(PO_4)_3$ | $LiTi_2(PO_4)_3$ | 0.52 | 26 |
| Example 49 | $Li_{1.3}Al_{0.3}Ge_{1.7}(PO_4)_3$ | $LiGe_2(PO_4)_3$ | 0.46 | 22 |

INDUSTRIAL APPLICABILITY

As described above, the all-solid-state battery according to the present invention is effective in improving self-discharge characteristics. Particularly, provision of improved self-discharge characteristics significantly contributes in the fields of energy and electronics.

REFERENCE SIGNS LIST

50 All-solid-state battery
51 Exterior unit
52 Positive electrode current collector layer
53 Positive electrode active material layer
54 Negative electrode current collector layer
55 Negative electrode active material layer
56 Solid electrolyte layer
57 Terminal electrode
60 All-solid-state battery
61 Exterior unit
62 Positive electrode current collector layer
63 Positive electrode active material layer
64 Negative electrode current collector layer
65 Negative electrode active material layer
66 Solid electrolyte layer
67 Terminal electrode
10 Power storage unit
11 Positive electrode current collector layer
12 Positive electrode active material layer
13 Negative electrode current collector layer
14 Negative electrode active material layer

The invention claimed is:

1. An all-solid-state battery, comprising:
a positive electrode layer including a positive electrode current collector layer and a positive electrode active material layer provided on the positive electrode current collector layer;
a negative electrode layer including a negative electrode current collector layer and a negative electrode active material layer provided on the negative electrode current collector layer; and
a solid electrolyte layer which is arranged between the positive electrode layer and the negative electrode layer and contains a solid electrolyte,
wherein the all-solid-state battery includes a power storage unit in which the positive electrode layer and the negative electrode layer face each other with the solid electrolyte layer therebetween and an exterior unit,
the exterior unit has an ion conductivity of $10^{-2}$ S/cm or less,
the exterior unit has a porosity P of 0.4 or less,
a self-discharge rate of the all-solid-state battery is 6.5% or less,
a ratio Y of an ion conductivity of the exterior unit to an ion conductivity of the solid electrolyte layer (ion conductivity of exterior unit)/(ion conductivity of solid electrolyte layer) is $10^{-6} \leq Y \leq 1$, and the exterior unit consists of a binder and either one or both of $LiZr_2(PO_4)_3$ monoclinic crystal and $LiZr_2(PO_4)_3$ rhombohedral crystal.

2. The all-solid-state battery according to claim 1, wherein the exterior unit is arranged so that it covers parts of the power storage unit that are not connected to a terminal electrode.

3. The all-solid-state battery according to claim 1, wherein the exterior unit has an electron conductivity of $10^{-9}$ S/cm or less.

4. The all-solid-state battery according to claim 1, wherein the exterior unit has a porosity P of from 0.08 to 0.4.

* * * * *